(12) United States Patent
Kobara

(10) Patent No.: US 7,707,381 B2
(45) Date of Patent: Apr. 27, 2010

(54) STORAGE SYSTEM FOR PROCESSING ACCESS REQUEST FROM HOST AND METHOD FOR DOING THE SAME

(75) Inventor: Makoto Kobara, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 490 days.

(21) Appl. No.: 11/727,966

(22) Filed: Mar. 29, 2007

(65) Prior Publication Data

US 2007/0233997 A1 Oct. 4, 2007

(30) Foreign Application Priority Data

Apr. 4, 2006 (JP) ............................. 2006-103256

(51) Int. Cl.
*G06F 12/00* (2006.01)

(52) U.S. Cl. ...................... 711/170; 711/114; 711/162; 711/165; 711/203; 711/206; 711/E12.002; 711/E12.037

(58) Field of Classification Search ........................ None
See application file for complete search history.

(56) References Cited

FOREIGN PATENT DOCUMENTS

| JP | 07-152491 | 6/1995 |
|---|---|---|
| JP | 9-62452 | 3/1997 |
| JP | 2001-312372 | 11/2001 |
| JP | 2004-78398 | 3/2004 |

OTHER PUBLICATIONS

Notification of Reasons for Rejection mailed Apr. 15, 2008 in Japanese Patent Application No. 2006-103256 (3 pages).

*Primary Examiner*—Reginald G Bragdon
*Assistant Examiner*—Shawn X Gu
(74) *Attorney, Agent, or Firm*—Finnegan, Henderson, Farabow, Garrett & Dunner, L.L.P.

(57) ABSTRACT

Nodes include controllers, management servers, and storages. Each of the controllers includes a first mapping table indicating management servers corresponding to logical extents that compose a logical volume that is provided for a host. The management servers include second mapping tables indicating which nodes include storages that store logical extents corresponding to the management servers. The storages include third mapping tables indicating which physical extents of physical volumes included in the storages store the logical extents.

12 Claims, 17 Drawing Sheets

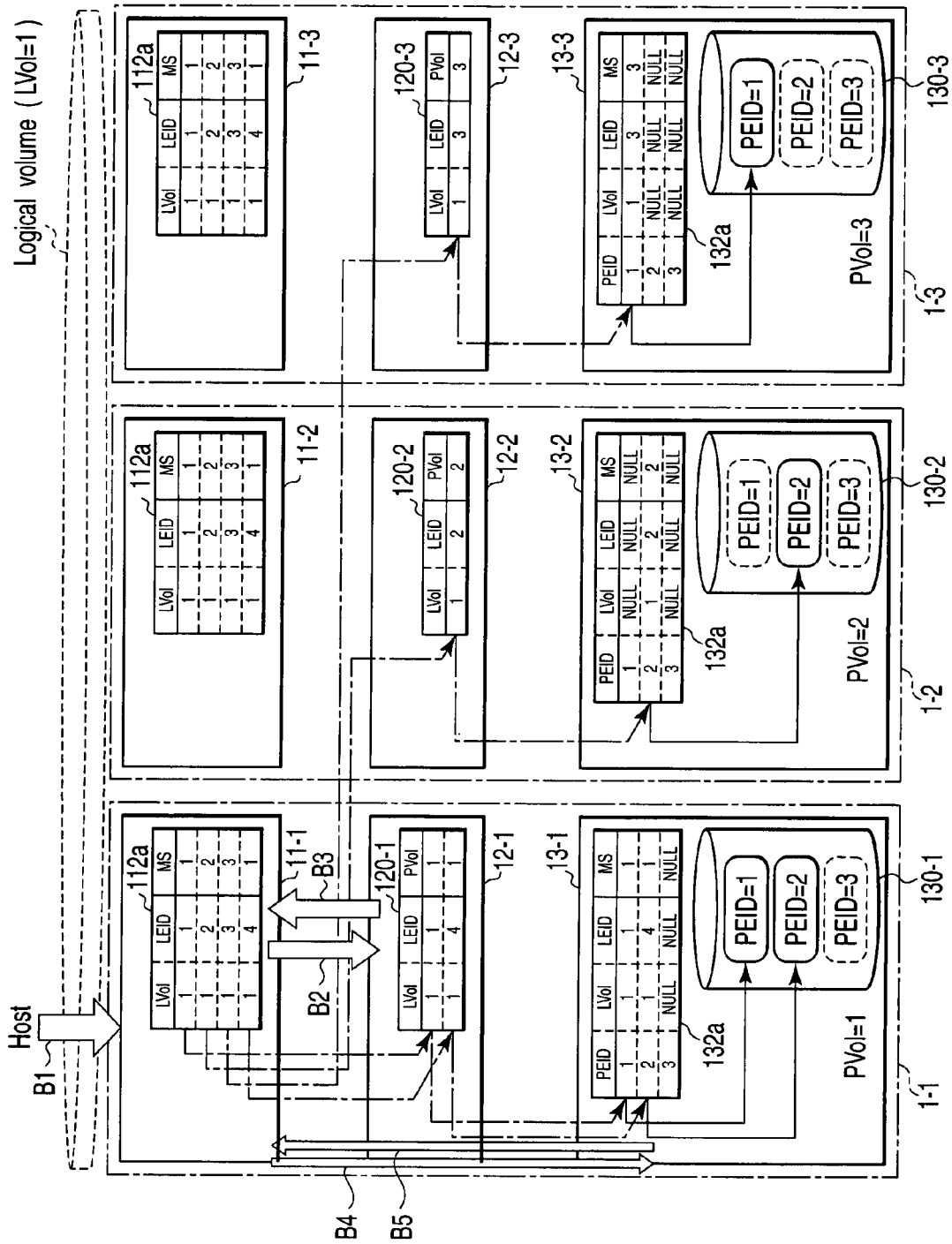
F I G. 7

LMMT 112a

| LVol | LEID | MS |
|---|---|---|
| 1 | 1 | 1 |
| 1 | 2 | 2 |
| 1 | 3 | 3 |
| 1 | 4 | 1 |

FIG. 8

LSMT 120-i (i=1)

| LVol | LEID | PVol |
|---|---|---|
| 1 | 1 | 1 |
| 1 | 4 | 1 |

FIG. 9

LPMT 132a

| PEID | VLol | LEID | MS |
|---|---|---|---|
| 1 | 1 | 1 | 1 |
| 2 | 1 | 4 | 1 |
| 3 | NULL | NULL | NULL |

FIG. 10

STORAGE SYSTEM FOR PROCESSING ACCESS REQUEST FROM HOST AND METHOD FOR DOING THE SAME

CROSS-REFERENCE TO RELATED APPLICATIONS

This application is based upon and claims the benefit of priority from prior Japanese Patent Application No. 2006-103256, filed Apr. 4, 2006, the entire contents of which are incorporated herein by reference.

BACKGROUND OF THE INVENTION

1. Field of the Invention

The present invention relates to a storage system that is configured by a plurality of nodes including a node having a physical volume. More specifically, the invention relates to a storage system for processing an access request from a host and a method for doing the same.

2. Description of the Related Art

A storage system including a plurality of storage devices (e.g., disk storage devices) connected to each other has recently been developed. A storage cluster (storage cluster system) is known as a storage system of this type.

The feature of the storage cluster is as follows. The storage areas (each referred to as a physical volume hereinafter) existing in a plurality of storage devices (each referred to as a node hereinafter) are bound together over the nodes to provide a host with at least one transversal, virtual storage area (referred to as a logical volume hereinafter) over the nodes. Assume here that the volume is referred to as a block volume to be accessed for each block.

The nodes of the storage cluster are storage devices which are operating at all times. In other words, generally, the nodes in operation deliberately participate in/separate from the storage cluster or they suddenly separate therefrom due to their failure. In the storage cluster, there occurs no frequent participation/separation of nodes due to, for example, everyday power-on/power-off.

In the storage cluster, data (a segment of data) is frequently migrated/copied appropriately to the physical volume of a node that stores the data or the physical volume of another node (automatically or manually). The migration/copy of data aims at making the data redundant and improving access performance and reliability while ensuring the transparency of access to a logic volume from the host. The data redundancy is required in case of a sudden stop of any of the nodes that form the storage cluster, a disk failure, or the like.

The host can gain access to the entire logic volume all over a plurality of nodes simply by accessing a node in the storage cluster through a path. Assume here that a failure occurs on a node to which the host extends a path and the node (failed node) stops. In this case, too, if the data stored in the failed node is made redundant to another node (live node) in the storage cluster, the host can extend a path to the live node again and continue access to the logic volume.

In order to configure the above storage cluster, a system is required to manage which position on which physical volume of which node data on a logical volume is located in. In general, the nodes of the storage cluster functionally include controllers and storages. The controllers manage a path to the host and receive access. The host can gain access to the same logical volume even though it extends a path to any controller. The storages each have a physical volume for storing data.

The volume (block volume) includes a plurality of extents. Each of the extents is formed of a set of fixed-length blocks. Each of the nodes manages one physical volume. On the other hand, the controller of each of the nodes manages physical extents of a physical volume and logical extents of a logical volume in association with each other by a mapping table. A logic volume (logic volume space) is therefore configured. The association between the physical extents and the logical extents using the mapping table is disclosed in, for example, Jon. Pat. Appln. KOKAI Publication No. 9-62452 (referred to as a prior art document hereinafter).

The above mapping table is called a Logical Extent to Physical Extent Mapping Table (LPMT). The LPMT is used to show which physical extents of the physical volume of which node (storage) logical extents of a logical volume is formed of. Each of the controllers of all the nodes in the storage cluster holds an LMPT of the same content. Each of the nodes manages the entire logical volume using the LPMT. The above is intended to continue access to the same logical volume immediately after a path set between a host and a controller is set between the host and another controller.

As described above, in the prior art storage cluster (storage system), each of the nodes has to manage the entire logical volume by the LPMT. However, the size of the LPMT becomes very large depending on the number of physical volumes and the number of extents that form the physical volumes. Thus, a great number of memories on the controllers are consumed.

A first logical extent stored in, e.g., a first physical extent of a node (referred to as a first node hereinafter) in the storage cluster is migrated to, e.g., a second physical extent of another node (referred to as a second node hereinafter). This migration is performed in order to reduce the load of the storage of, e.g., the first node. As described in the above prior art document, in order to improve the performance of access to the storage of a node, a first logical extent stored in a physical extent of the node is sometimes migrated to another physical extent of the node. This migration can improve the performance of access to the storage cluster and the reliability thereof.

According to the storage cluster described above, in order to improve the performance of access to the storage cluster and the reliability thereof, a logical extent stored in a physical extent is migrated/copied to another physical extent in the same storage or a physical extent in another storage. In this case, the controllers of the storage cluster have to be synchronized with each other to update their own LPMTs at once (simultaneously). The simultaneous updating complicates the management of the LPMT and adversely affects the performance of access to the storage cluster.

BRIEF SUMMARY OF THE INVENTION

According to an embodiment of the present invention, there is provided a storage system. The storage system comprises a plurality of nodes, at least one of the nodes including a storage having a physical volume, the storage mapping logical extents that compose a logical volume in physical extents of the physical volume and storing the logical extents in the physical volume, and an interface which connects the nodes and a host, wherein at least two of the nodes include controllers which provide the host with the logical volume and receive access from the host, said at least one of the nodes or at least another one of the nodes includes a management server which performs a location management service to reply to an inquiry about a location of a storage that stores the logical extents of the logical volume from any of the controllers, each of the controllers includes a first mapping table indicating a management server corresponding to the logical extents of the logical volume, the management server includes a second mapping table indicating which node includes a storage that stores logical extents corresponding to the management server, the storage includes a third mapping table indicating which physical extents of a physical volume included in the storage store the logical extents, when each of the controllers receives an access request that designates a logical extent in the logical volume as an access destination from the host, said each of the controllers refers to the first mapping table to specify a management server corresponding to the logical extent of the access destination, and inquires of the specified management server which storage stores the logical extent, when the management server receives an inquiry from one of the controllers, the management server refers to the second mapping table to specify the inquired storage, and notifies the one of the controllers, which is an inquiry source, of information indicating the storage as a reply to the inquiry, each of the controllers requests the storage indicated by the information as a reply to the inquiry to gain access to the logical extent designated by the host, and when one of the controllers requests the storage to gain access to a logical extent, the storage refers to the third mapping table to specify a physical extent corresponding to the designated logical extent in the physical volume, gains access to the specified physical extent, and replies to the one of the controllers which is an access request source.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a diagram of a system corresponding to the system of FIG. 1, which is so configured that a logical volume whose logical volume ID(LVol) is 1 includes four logical extents of logical extent ID(LEID) 1 to logical extent ID(LEID) 4;

FIG. 8 is a diagram of a data structure of a Logical Extent to Management Server Mapping Table (LMMT) in the system configuration of FIG. 7;

FIG. 9 is a diagram of a data structure of a Logical Extent to Storage Mapping Table (LSMT) in the system configuration of FIG. 7;

FIG. 10 is a diagram of a data structure of a Logical Extent to Physical Extent Mapping Table (LPMT) in the system configuration of FIG. 7;

DETAILED DESCRIPTION OF THE INVENTION

Embodiments of the present invention will be described with reference to the accompanying drawings.

First Embodiment

Figure 1:
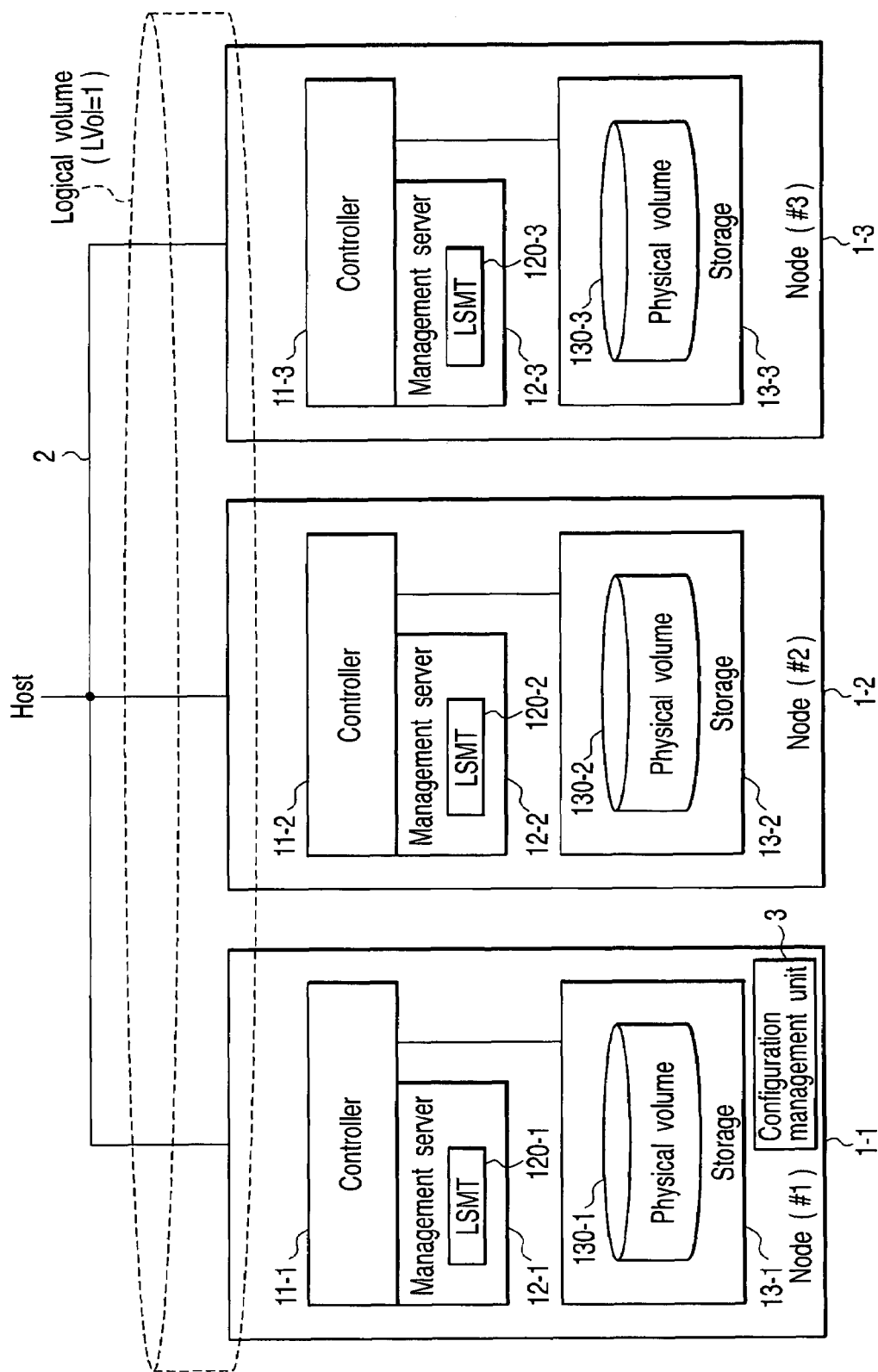
FIG. 1 is a schematic block diagram of a storage system having a storage cluster configuration according to a first embodiment of the present invention.

FIG. 1 is a schematic block diagram of a storage system having a storage cluster configuration according to a first embodiment of the present invention. The storage system shown in FIG. 1 (referred to as a storage cluster hereinafter) includes a plurality of storage devices (referred to as nodes hereinafter), e.g., three nodes 1-1, 1-2 and 1-3 (#1, #2 and #3). The nodes 1-1, 1-2 and 1-3 are connected to a host (host computer) via an interface 2 such as a fiber channel and an Internet Small Computer System Interface (iSCSI). The host uses the cluster storage. The nodes 1-1, 1-2 and 1-3 include controllers 11-1, 11-2 and 11-3, management servers 12-1, 12-2 and 12-3, and storages 13-1, 13-2 and 13-3, respectively.

The controller 11-i (i=1, 2, 3) provides the host with a logical volume. Assume here that the host is provided with a logical volume whose ID(logical volume ID) is x, e.g., "1" by binding the physical volumes (described later) of the storages 13-1, 13-2 and 13-3. Hereinafter, the logical volume ID will be represented as LVol, and the logical volume whose logical volume ID is LVol will be represented as logical volume LVol. Further, the logical volume whose logical volume ID is x (LVol=x) is represented as logical volume LVolx, logical volume "LVol=LVolx" or logical volume "LVol=x".

The controller 11-i receives an access request from the host. The access request includes an address (logical block address) LBA indicating a logical block in a logical volume to be accessed. The controller 11-i inquires of the management server 12-j (j=1, 2, 3) which node includes a storage that stores a logical extent including the requested logical block, with reference to an LMMT 112a described later. In response to the inquiry, the management server 12-j notifies the controller 11-i of the storage of the node, and the controller 11-i gains access to the storage.

Figure 2:
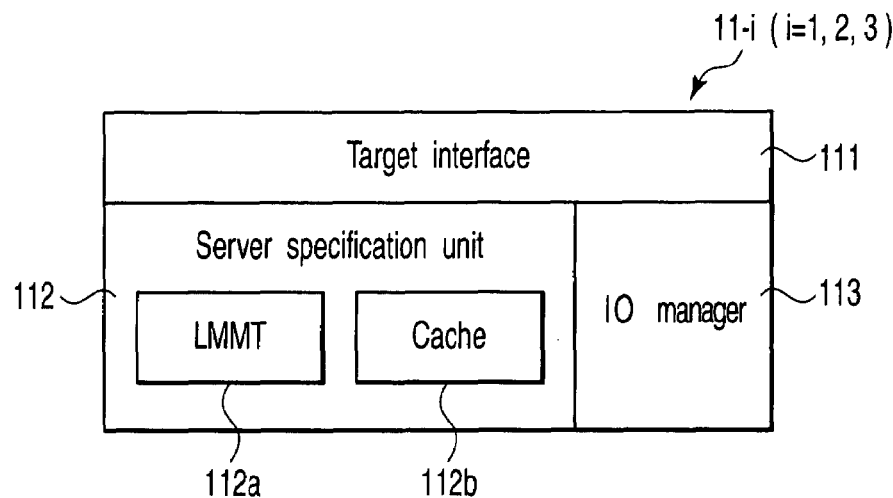
FIG. 2 is a block diagram of a controller in the storage system shown in FIG. 1.

FIG. 2 is a block diagram of the controller 11-i. The controller 11-i includes a target interface 111, a server specification unit 112, and an input/output manager (IO manager) 113.

The target interface 111 receives an access request from the host and specifies a logical extent in which the logical block address LBA of a requested logical volume (the logical block indicated by the logical block address LBA) is located. The logical extent ID(LEID) that identifies the logical extent is specified by the computation of the following:

LEID=LBA/extent size

Through the server specification unit 112, the target interface 111 inquires of the management server 12-j which storage stores the logical extent in the specified logical volume. This inquiry includes a logical volume ID(LVol)/logical extent ID(LEID) for identifying a logical volume/logical extent. The target interface 111 gains access to a storage that is notified via the server specification unit 112 in response to the inquiry of the management server 12-i, and replies to the host.

The server specification unit 112 specifies a management server 12-j that transfers an inquiry from the target interface 111. Hereinafter, the logical extent indicated by the logical volume ID and logical extent ID included in the inquiry from the target interface 111 may be referred to as a target logical extent. The management server 12-j is specified as a server for managing the location of a storage that stores the target logical extent.

The server specification unit 112 has Logical Extent to Management Server Mapping Table (LMMT) 112a. The LMMT 112a is a mapping table (first mapping table) for specifying the management server that manages the location of the target logical extent. The LMMT 112a holds the IDs (MS) of nodes for providing management servers which are responsible for the locations (which manage the locations) of storages that store the logical extents.

The server specification unit 112 receives an inquiry from the controller 11-1 and transmits it to the specified management server. The unit 112 receives a response to the inquiry from the management server 12-j and sends it to the target interface 111. This response includes the node ID(PVol) of the storage in which the target logical extent is stored. The node ID(PVol) of the storage will be described later. The unit 112 also has a cache 112b. The cache 112b will also be described later in the fifth embodiment. The IO manager 113 provides an interface between the controller 11-i and the storage 13-j.

Referring again to FIG. 1, the management server 12-i (i=1, 2, 3) checks the node ID of a storage that stores a logical extent inquired by the controller 11-j (j=1, 2, 3), and notifies the controller 11-j of the node ID. The management server 12-i has a Logical Extent to Storage Mapping Table (LSMT) 120-i. In other words, the management servers 12-1, 12-2 and 12-3 have LSMT 120-1, 120-2 and 120-3, respectively. The LSMT 120-i (i=1, 2, 3) is a mapping table (second mapping table) for managing which node IDs are assigned to nodes including storages (physical volumes) that store the logical extents which the management server 12-i in itself takes charge of.

The storages 13-1, 13-2 and 13-3 have physical volumes 130-1, 130-2 and 130-3, respectively. The ID(PVol) of the physical volume 130-1 is 1, that of the physical volume 130-2 is 2, and that of the physical volume 130-3 is 3. In the first embodiment, the ID(PVol) of the physical volume 130-i (i=1, 2, 3) is "i". The storage 13-i maps the logical extent on the physical extent and stores it in the physical volume 130-i. The storage 13-i receives an input/output request (IO request) from the controller 11-i. The IO request includes the ID(LEID) of the logical extent in a logical volume to be accessed. The storage 13-i checks a physical extent that corresponds to the logical extent. The storage 13-i performs an IO operation for the physical extent and replies to the controller 11-i.

Figure 3:
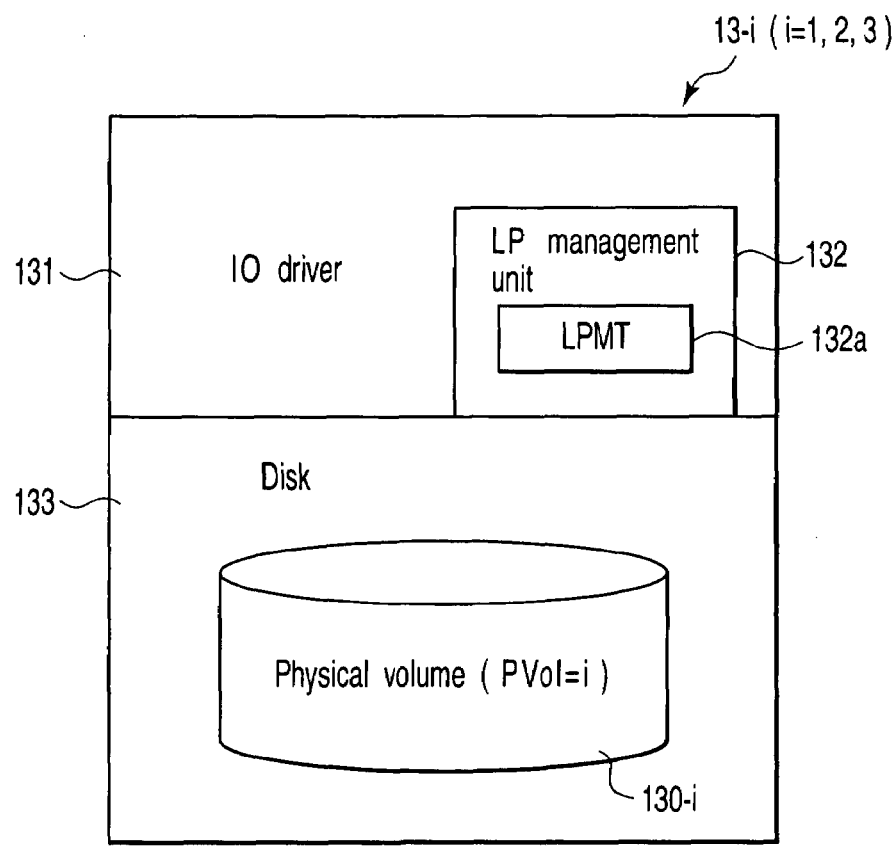
FIG. 3 is a block diagram of a storage in the storage system shown in FIG. 1.

FIG. 3 shows the configuration of the storage 13-i (i=1, 2, 3). The storage 13-i includes an IO driver 131, a Logical Extent to Physical Extent management unit (LP management unit) 132, and a disk 133. The IO driver 131 provides an interface between the storage 13-i and the controller 11-i.

The LP management unit 132 manages a correspondence between a logical extent and a physical extent. The unit 132 holds a Logical Extent to Physical Extent Mapping Table (LPMT) 132a. The LPMT 132a is a mapping table (third mapping table) for indicating which physical extents of the physical volume 130-i in the storage 13-i including the LPMT 132a logical extents are made correspondent to and stored in. It should be noted that the LPMT 132a of the first embodiment differs from the LPMT of prior art and has no mapping information for the entire logical volume. It should also be noted that the contents of the LPMT 132a vary from storage 13-i to storage 13-i.

The disk 133 has a physical volume 130-i (PVol=i). The physical volume 130-i is managed in units of physical extent. The unit of access to the physical volume 130-i is a block, and a physical extent includes a plurality of blocks.

The storage cluster shown in FIG. 1 has a configuration management unit 3 that controls the scheme and management of the configuration of the cluster. When creating a volume, the configuration management unit 3 determines a physical volume/physical extent which is a storage destination of a logical volume/logical extent. The unit 3 also determines a migration source/migration destination for migrating/copying an extent and a location management service (copying for redundancy). Further, the unit 3 determines a destination to which an extent is assigned on demand. The unit 3 is provided in, for example, the node 1-1. However, it can be provided in the node 1-2 or 1-3 or independently of the nodes 1-1 to 1-3.

In the first embodiment, the configuration management unit 3 creates a logical volume by the following procedures.

(a) The configuration management unit 3 determines which node IDs are assigned to nodes including storages that store the logical extents of a logical volume. The unit 3 assigns the physical extents of the storage of the determined nodes (nodes of the determined node IDs) to the logical extents. The unit 3 generates LPMTs 132a and set them in the storages 13-1 to 13-3, the LPMTs 132a indicating a correspondence between the physical extents of the storages and logical extents to which the physical extents are assigned.

(b) From the storages (physical volumes) that store physical extents to which the logical extents are assigned, the configuration management unit 3 determines which of the nodes 1-1 to 1-3 has a management server that takes charge of a service for managing the locations of the logical extents (location management service). The unit 3 generates LSMT 120-1 to 120-3 and sets them in their respective management servers 12-1 to 12-3, the LSMT 120-1 to 120-3 indicating a correspondence between logical extents and physical volumes which are in charge of the management servers. Unlike in the second embodiment described later, the LSMT need not be set in all of the management servers 12-1 to 12-3 in the storage cluster.

(c) The configuration management unit 3 generates an LMMT 112a and distributes it to all of the controllers 11-1 to 11-3. As described above, the LMMT 112a indicates which management server is inquired of a storage (physical volume) that stores a physical extent to which each of the logical extents of a logical volume is assigned.

The logical volume is thus created. The host can thus gain access to the created logical volume. The access to the logical volume from the host is performed by leading a path from the host to the controller 11-i of any one 1-i of the nodes 1-1 to 1-3.

Figure 4:
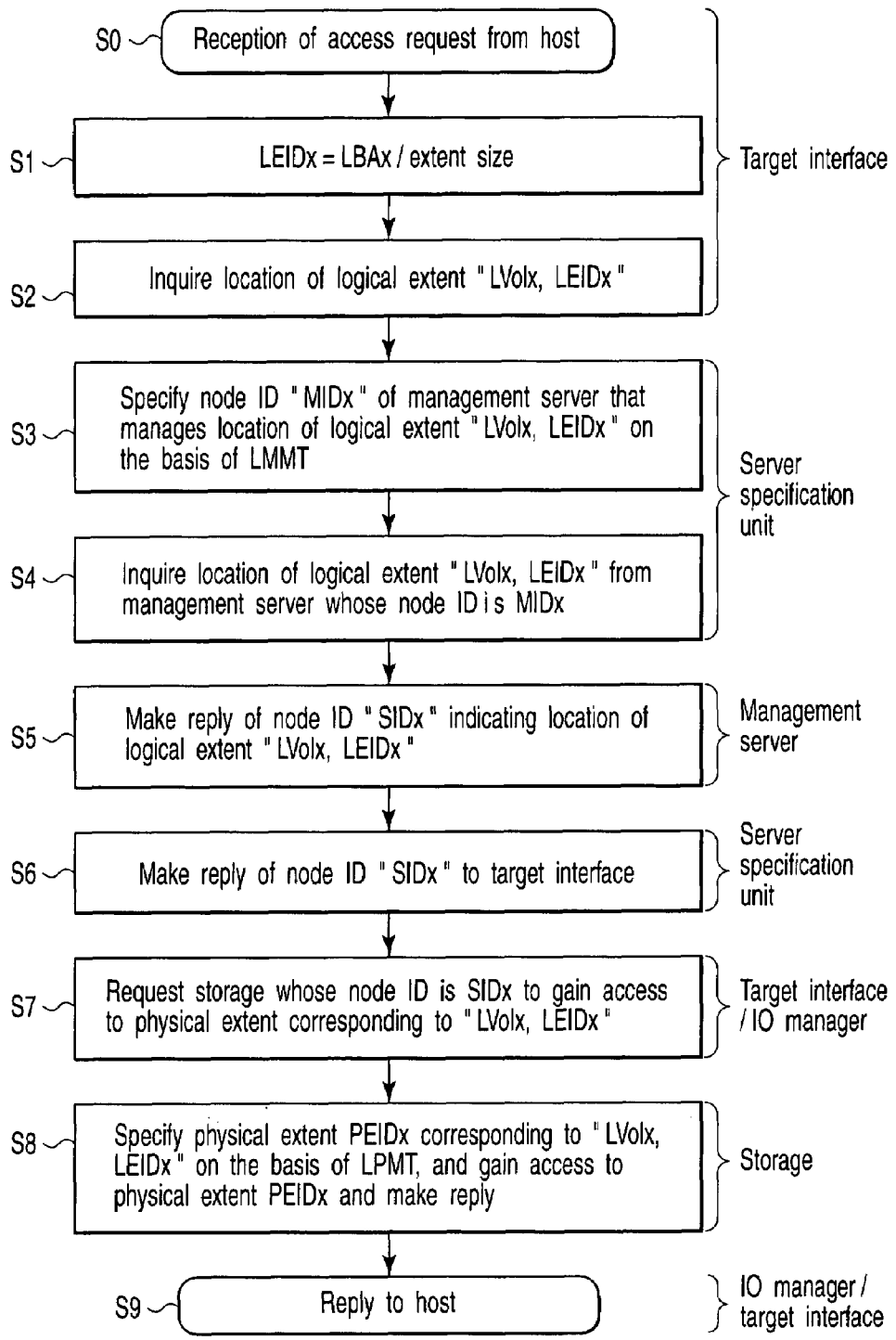
FIG. 4 is a flowchart of the procedures of a process performed when a host issues an access request in the storage system according to the first embodiment of the present invention.
Figure 5:
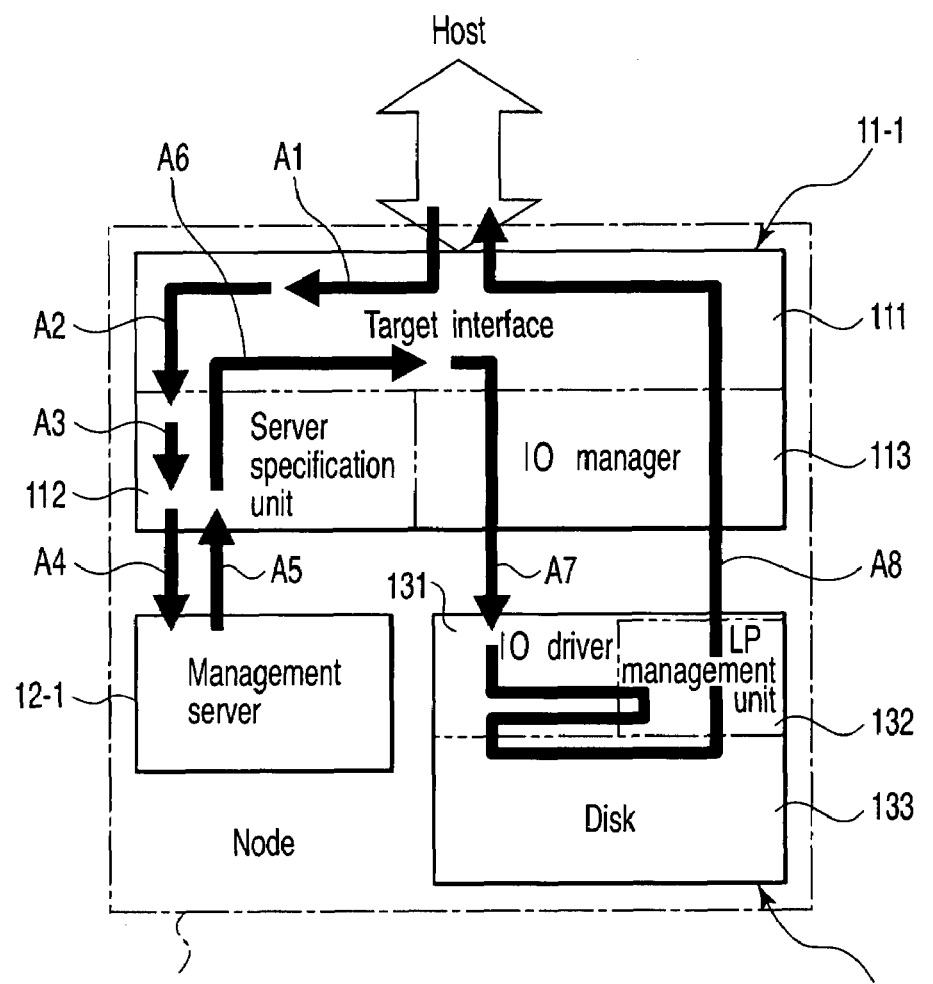
FIG. 5 is a diagram of a flow of information when the host issues an access request in the storage system according to the first embodiment of the present invention.

The flow of a process performed when the host issues an access request after a path is extended to the node 1-1 (i=1) from the host, will be described below with reference to FIGS. 4 and 5. FIG. 4 is a flowchart of the procedures of the process, and FIG. 5 is a diagram of the flow of information. Arrows A1 to A8 in FIG. 5 correspond to their respective steps S1 to S8 in the flowchart of FIG. 4.

Assume first that the host issues an access request (IO request) to the target interface 111 included in the controller 11-1 of the node 1-1. Assume also that the access request indicates a request for access to a logical block address LBA (=LBAx) of a logical volume "LVol=LVolx". In the first embodiment, LVol (=LVolx) is 1. Assume here that the name (logical volume name) of the logical volume "Lvol=LVolx" coincides with the ID(LVol=LVolx) of the logical volume.

The target interface 111 receives an access request from the host (step S0). Then, the target interface 111 obtains the ID (=LEIDX) of a logical extent in which LBAx is located, from a logical block address LBA (=LBAX) on the logical volume "LVol=LVolx" to be accessed by the access request from the host (step S1). In the first embodiment, the target interface 111 obtains the logical extent ID (=LEIDX) by the following equation:

LEIDx=LBAx/extent size

Here, the logical extent whose logical extent ID is LEIDx on logical volume "LVol=LVOlx (=1)" is expressed as logical extent "LVolx, LEIDx". The logical extent "LVolx, LEIDx" is sometimes expressed simply as a logical extent LEIDx.

The target interface 111 transfers the logical volume name (logical volume ID) LVol (=LVolx=1) and the obtained logical extent ID (=LEIDx) to the server specification unit 112 (step S2). Thus, the target interface 111 inquires which node includes a storage that stores the logical extent "LVolx, LEIDx" (i.e., the location of the logical extent "LVolx, LEIDx").

In reply to the inquiry from the target interface 111, the server specification unit 112 specifies the ID of a node that provides a management server that manages the location of the logical extent "LVolx, LEIDx" (step S3). This ID may also be called the node ID of the management server. The node ID of the management server is expressed as MS (or MID) and the node ID of a management server that manages the location of the logical extent "LVolx, LEIDx" is expressed as MIDx (MS=MIDX). In this case, MIDx(MS=MIDx) is specified as the node ID of the management server in step S3.

The node ID(MS=MIDx) is specified with reference to the LMMT 112a. This is because the LMMT 112a holds the node ID(MS=MIDx) in association with LVolx and LEIDx as is apparent from the data structure described later (see FIG. 8). The node 1-1 includes the server specification unit 112 that specifies the node ID(MS=MIDx). Assume in the first embodiment that the ID(MS=MIDX=1) of the node 1-1 (i.e., the node 1-1 that provides the management server 12-1) is specified.

In the first embodiment, the storages 13-1, 13-2 and 13-3 of the nodes 1-1, 1-2 and 1-3 have physical volumes 130-1, 130-2 and 130-3, respectively. In other words, the storages 13-1, 13-2 and 13-3 of the nodes 1-1, 1-2 and 1-3 each have one physical volume. Thus, the ID(MS) of the nodes 1-1, 1-2 and 1-3 that provide the management servers 12-1, 12-2 and 12-3 are 1, 2 and 3, while the ID(PVol) of the physical volumes 130-1, 130-2 and 130-3 included in the storages 13-1, 13-2 and 13-3 of the nodes 1-1, 1-2 and 1-3 are 1, 2 and 3. The ID(MS) and ID(PVol) therefore coincide with each other.

The server specification unit 112 transfers an inquiry from the target interface 111 to the management server 12-1 of the specified node 1-1 (step S4). In other words, the unit 112 inquires the location of a logical extent (target logical extent) "LVolx, LEIDx" of the management server 12-1. The location of the logical extent "LVolx, LEIDx" means a node to which a storage that stores a physical extent corresponding to the logical extent "LVolx, LEIDx" belongs, and the ID of this node is inquired. The ID of the node to which the storage belongs may also be called the node ID of the storage. The node ID of the storage is expressed as PVol (or SID), and the node ID of a storage that stores a physical extent corresponding to the logical extent "LVolx, LEIDx" is expressed as SIDx(PVol=SIDx).

On the basis of the LSMT 120-1, the management server 12-1 specifies which node ID"SIDx" is assigned to a node including a storage that stores a physical extent corresponding to the logical extent "LVolx, LEIDx" (step S5). Referring here to the PVol (=SIDx) of an entry in the LSMT 120-1 associated with the logical extent "LVolx, LEIDx", the above node ID"SIDx" is specified. In step S5, the management server 12-1 notifies the inquiring server specification unit 112 of the specified node ID"SIDx". The unit 112 transfers the node ID"SIDx", which is received from the management server 12-1, to the target interface 111 as a response to the inquiry from the target interface 111 (step S6). Assume here that the node ID"SIDx" of the storage 13-1 is transferred to the target interface 111.

The target interface 111 requires the storage 13-1 of the node 1-1 indicated by the transferred node ID"SIDx" to gain access to a physical extent corresponding to the logical extent "LVolx, LEIDx" through the IO manager 113 (step S7). The IO driver 131 of the storage 13-1 specifies a physical extent in the storage 13-1 (physical volume 130-1), which is associated with the required logical extent "LVolx, LEIDx", as follows (step S8). First, the IO driver 131 refers to the LPMT 132a and specifies the ID(PEID=PEIDx) of a physical extent associated with the logical extent "LVolx, LEIDx", as is apparent from the data structure of the LPMT 132a described later (see FIG. 10). The IO driver 131 specifies a target physical extent by the specified ID (=PEIDx). In other words, the IO driver 131 specifies a physical extent associated with the logical extent "LVolx, LEIDx" on the basis of the LPMT 132a.

The ID (physical extent ID) of a physical extent is expressed as PEID, and the ID of a physical extent associated with the logical extent "LVolx, LEIDx" is expressed as PEIDx. Further, a physical extent whose physical extent ID is PEIDx is expressed as a physical extent PEIDx. In this case, the IO driver 131 specifies a physical extent PEIDx associated with the logical extent "LVolx, LEIDx" in step S8.

In step S8, the IO driver 131 also gains access to the specified physical extent PEIDx and returns a result of the access to the IO manager 113 of the controller 11-1 as a response. The target interface 111 receives the response from the IO manager 113 and returns it to the host (step S9).

Figure 6:
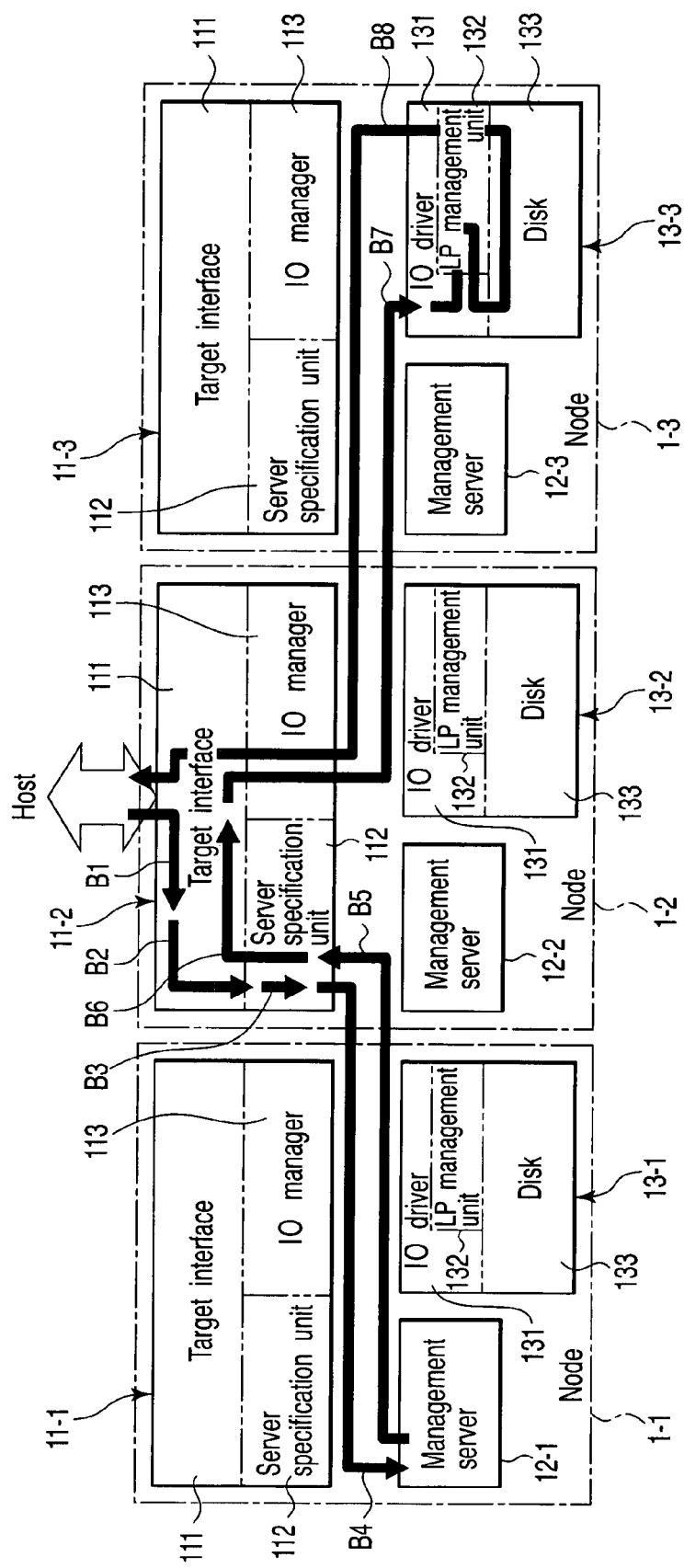
FIG. 6 is a diagram of a modification to the flow of information shown in FIG. 5.

The above descriptions are made on the basis of the following assumption. A target interface that receives an access request from the host, a management server that manages which storage stores a target logical extent, and a storage whose physical extent stores the target logical extent all belong to the same node 1-1 (first case). However, these target interface, management server and storage may belong to different nodes (second case). FIG. 6 shows a flow of information in the second case. In FIG. 6, arrows B1 to B8 correspond to steps S1 to S8 in the flowchart shown in FIG. 4.

FIG. 7 shows a system corresponding to the system of FIG. 1, which is so configured that the logical volume "LVol=1" includes four logical extents of LEID (logical extent ID) 1 to LEID (logical extent ID) 4. FIG. 8 shows a data structure of the LMMT 112a in the system configuration of FIG. 7. FIG. 9 shows a data structure of the LSMT 120-i, e.g., the LSMT 120-1 of the node 1-1 in the system configuration of FIG. 7. FIG. 10 shows a data structure of, e.g., the LPMT 132a of the node 1-1 in the system configuration of FIG. 7.

The LMMT 112a has entries the number of which is equal to that of logical extents which compose the logical volume "LVol=1". Each of the entries holds the ID(LVol) of a logical volume, the ID(LEID) of a logical extent, and the ID(MS) of a node that provides the management server 12-j in association with one another. The LEID indicates the ID of a logical extent included in the logical volume represented by LVol associated with the LEID. The MS indicates the ID of a node that provides the management server 12-j. The management server 12-j manages which storage (physical volume) stores the logical extent "LVol, LEID" represented by LVol and LEID associated with the MS (or it manages the location of the logical extent). It is shown in FIG. 8 that the logical extents of the logical volume "LVol=1" are four logical extents of LEID 1 to LEID 4.

The LSMT 120-i (120-1) has entries the number of which is equal to that of logical extents which are managed by the management server 12-i (12-1). Each of the entries of the LSMT 120-i (120-1) holds the ID(LVol) of a logical volume, the ID(LEID) of a logical extent, and the node ID(PVol) of a storage (physical volume) in association with one another. The LEID indicates the ID of a logical extent included in the logical volume represented by LVol associated with the LEID. The PVol indicates the node ID (physical volume number) of a storage (physical volume) which stores logical extents represented by the LEID and LVol associated with the PVol.

The LPMT 132a has entries the number of which is equal to that of physical extents which compose the physical volume 130-i (130-1). Each of the entries of the LPMT 132a holds the ID(PEID) of a physical extent included in the physical volume 130-i, the ID(LVol) of the physical volume, the ID(LEID) of a logical extent, and the ID(MS) of a node that provides a location management service (management server 12-j). The LVol indicates the ID of a logical volume including a logical extent to which the physical extent represented by PEID associated with the LVol is assigned. The MS indicates the ID of a node that provides a location management service (management server 12-j). The location management service (management server 12-j) manages which storage (physical volume) stores a logical extent to which the physical extent represented by the PEID associated with the MS is assigned, (or it manages the location of the logical extent). The MS held in each of the entries in the LPMT 132a is used for an inverted index of the location management service. It is shown in FIG. 10 that the physical extents of the physical volume 130-i (130-1) are three physical extents of PEID 1 to PEID 3.

In FIG. 7, alternate long and short dashed arrows, which extend from the entries of the LMMT 112a included in the controller 11-1 toward the LSMTs 120-1 to 120-3 of the management servers 12-1 to 12-3, denote the entries of the LSMTs 120-1 to 120-3 referred to by information of the entries of the LMMT 112a. Similarly, alternate long and short dashed arrows, which extend from the entries of the LSMTs 120-1 to 120-3 toward the LPMTs 132a of the storages 13-1 to 13-3, denote the entries of the LPMTs 132s referred to by information of the entries of the LSMTs 120-1 to 120-3. Similarly, alternate long and short dashed arrows, which extend from the entries of the LPMTs 132a of the storages 13-1 to 13-3 toward the physical volumes 130-1 to 130-3 of the storages 13-1 to 13-3, denote the physical extents to be accessed on the basis of information of the LPMTs 132a.

A flow of access to a block, which is to be designated by logical volume "LVol=1"/logical extent "LEID=1", from a host after a path is extended from the host to the node 1-1, will be described with reference to FIG. 7. The logical volume "LVol=1" indicates a logical volume whose logical volume ID(LVol) is 1, and the logical extent "LEID=1" indicates a logical extent whose logical extent ID(LEID) is 1. The logical volume "LVol=1"/logical extent "LEID=1" indicates logical extent "LEID=1" on the logical volume "LVol=1". In this case, the logical extent "LEID=1" can be expressed as logical extent "LVol=1, LEID=1".

Assume first that the host issues to the node 1-1 a request for access to a block in the logical volume "LVol=1" as indicated by arrow B1 in FIG. 7. The controller 11-1 of the node 1-1 (the target interface 111 included in the controller 11-1) determines that a bock to be accessed is stored in the logical extent whose LEID is 1 (logical extent "LEID=1").

The controller 11-1 (the target interface 111) inquires of the server specification unit 112 in the controller 11-1 which node includes a storage (physical volume) that stores the logical extent "LEID=1" (the location of the logical extent "LEID=1"). The server specification unit 112 refers to an entry (an entry of the first row in FIG. 8) which holds "LEID=1" in the LMMT 112a of the unit 112. Thus, the unit 112 recognizes that the management server corresponding to the logical volume "LVol=1"/logical extent "LEID=1" is present in the node 1-1. The controller 11-1 (the server specification unit 112 of the controller 11-1) inquires the location of the logical volume "LVol=1"/logical extent "LEID=1" of the management server 12-1 in the node 1-1, as indicated by arrow B2 in FIG. 7.

The management server 12-1 refers to an entry (an entry of the first row in FIG. 9) which holds a pair of "LVol=1" and "LEID=1" in the LSMT 120-1 of the management server 12-1. Thus, the management server 12-1 recognizes that the substance of the logical volume "LVol=1"/logical extent "LEID=1" is stored in the storage (physical volume) of the node 1-1. The management server 12-1 sends the ID (SIDx=PVol=1) of the node 1-1 to the controller 11-1 (the server specification unit 112 of the controller 11-1), as indicated by arrow B3 in FIG. 7 (step B3). Then, the server specification unit 112 of the controller 11-1 notifies the target interface 111 of the controller 11-1 of the ID (SIDX=PVol=1) of the node 1-1.

The controller 11-1 (the target interface 111 of the controller 11-1) requests the storage designated by the node ID (or the storage 13-1 of the node 1-1) to gain access to the logical volume "LVol=1"/logical extent "LEID=1" (via the IO manager 113), as indicated by arrow B4 in FIG. 7. The storage 13-1 of the node 1-1 refers to an entry (an entry of the first row in FIG. 10) which holds "LVol=1"/"LEID=1" in the LPMT 132a of the storage 13-1. Thus, the storage 13-1 recognizes that the ID(PEID) of a physical extent corresponding to the volume "LVol=1"/logical extent "LEID=1" is 1. The storage 13-1 accesses to the physical extent whose PEID is 1 (physical extent "PEID=1") and replies to the controller 11-1 as indicated by arrow B5 in FIG. 7.

In the first embodiment, the LMMTs 112a of the controllers 11-1 to 11-3 of the nodes 1-1 to 1-3 have the same content. In other words, the LMMT 112a is shared with the nodes 1-1 to 1-3 (controllers 11-1 to 11-3). The host can thus extend a path to any one of the nodes 1-1 to 1-3 (the controller of any one of the nodes 1-1 to 1-3) which compose the storage cluster. If a controller to which the host extends a path stops abnormally or if the load of the controller increases, the host can extend a path to another controller.

The information shared with the nodes 1-1 to 1-3 (shared information) such as the LMMT 112a is stored in the storage areas of nonvolatile memories of the controllers 11-1 to 11-3 of the nodes 1-1 to 1-3, those of the storages 13-1 to 13-3 of the nodes 1-1 to 1-3, or that of any of the storages 13-1 to 13-3. Referring to these storage areas, the controllers 11-1 to 11-3 manage the shared information. For this management, the address of the storage areas is shared with the controllers 11-1 to 11-3. The shared information includes logical volume configuration information as well as the LMMT 112a. The logical volume configuration information indicates what logical volume the storage cluster shown in FIG. 1 provides for the host. As compared with the prior art, the above configuration in which information is shared with the nodes 1-1 to 1-3 can reduce the amount of information that should be managed by the nodes 1-1 to 1-3.

Figure 11:
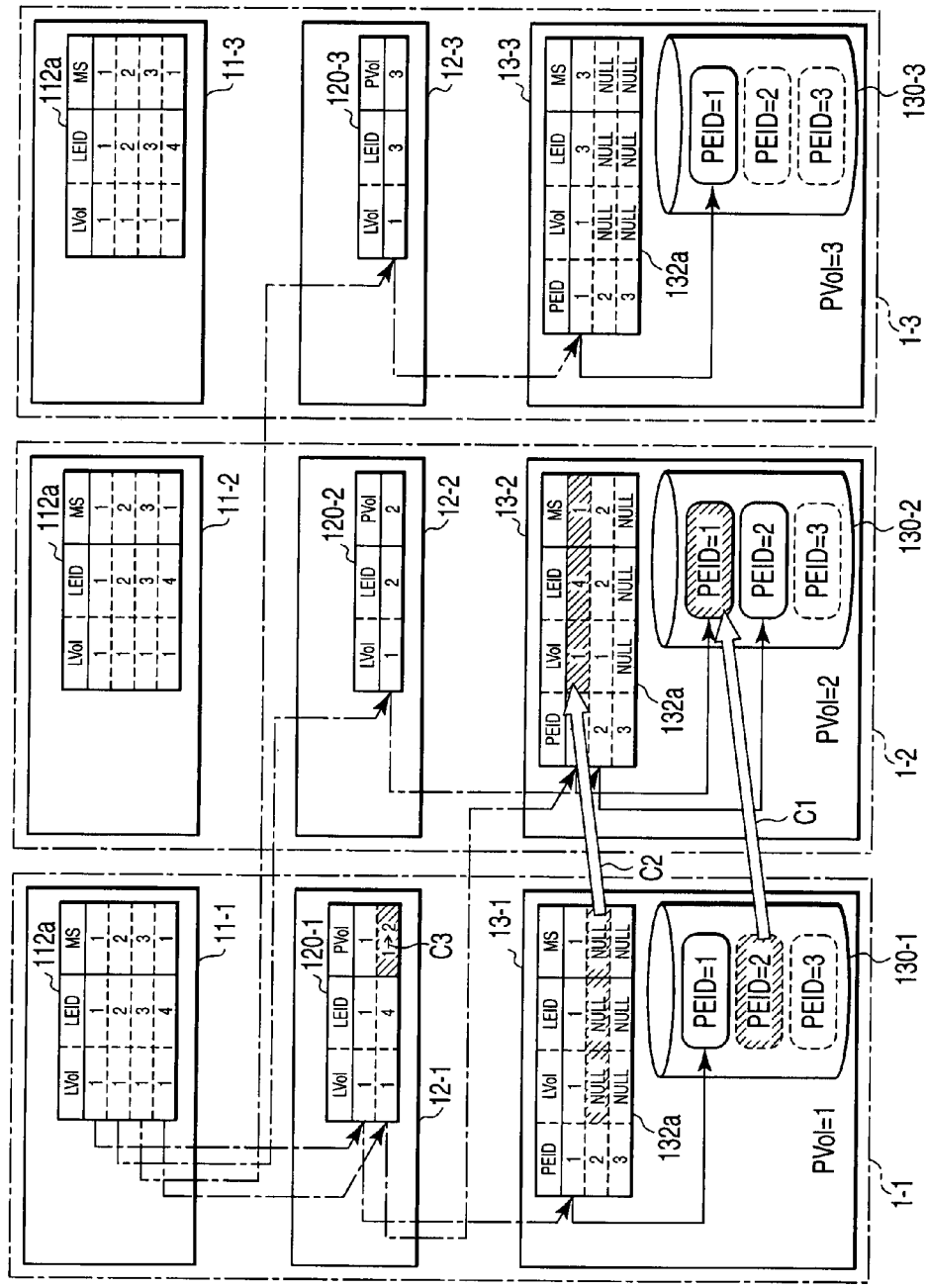
FIG. 11 is an illustration of an operation of migrating data of a physical extent that forms a logical extent to a physical extent in another storage in the storage system according to the first embodiment of the present invention.

An operation of migrating data of a physical extent that forms a logical extent in a storage to a physical extent in another storage will be described with reference to FIG. 11. First, the configuration management unit 3 determines the source and destination from and to which data is migrated. Assume here that when the storage cluster shown in FIG. 1 is set in the state shown in FIG. 7, the physical volume "PVol=1" (physical volume 130-1)/physical extent "PEID=2" in the storage 13-1 of the node 1-1, which is associated with the logical extent "LEID=4", is determined as the migration source of data. Also, assume that the physical volume "PVol=2" (physical volume 130-2)/physical extent "PEID=1" in the storage 13-2 of the node 1-2 is determined as the destination of data migration. The expression form of physical volume "PVol=p"/physical extent "PEID=q" indicates the physical extent whose physical extent ID(PEID) is "q" on the physical volume whose physical volume ID(PVol) is "p".

In the above example, the data stored in the physical volume "PVol=1"/physical extent "PEID=2" in the storage 13-1 of the node 1-1 is migrated to the physical volume "PVol=2"/physical extent "PEID=1" in the storage 13-2 of the node 1-2. The LPMT 132a of each of the storage 13-1 of the migration source of data and the storage 13-2 of the migration destination thereof is rewritten. Here, LVol (=1), LEID (=4) and MS (=1) in the entry which holds "PEID=2" in the LPMT 132a of the storage 13-1 are all rewritten to "NULL". LVol (=NULL), LEID (=NULL) and MS (=NULL) in the entry which holds "PEID=1" in the LPMT 132a of the storage 13-2 are rewritten to 1, 4 and 1, respectively, as indicated by arrow C2 in FIG. 11.

Further, the LSMT 120-1 of the management server 12-1 which refers to the logical extent "LEID=4" (or which takes charge of a location management service regarding the logical extent "LEID=4") is rewritten. Here, PVol (=1) in the entry that holds "LEID=4" in the LSMT 120-1 is rewritten to 2, as indicated by arrow C3 in FIG. 11.

As described above, in the first embodiment, the notification (updating) of migration of the logical extent (LEID=4) has only to be made for the management server (12-1) that manages the logical extent (LEID=4). In other words, the notification need not be made for all of the nodes 1-1 to 1-3 that compose the storage cluster. Accordingly, the costs for notification can be lowered.

An operation of copying data of a physical extent that forms a logical extent in a storage to a physical extent in another storage will be described with reference to FIG. 12. This copying operation is carried out in order to improve a fault tolerance by making the physical extent redundant and increase the speed of read access by parallel processing.

First, the configuration management unit 3 determines the source and destination from and to which data is copied. Assume here that when the storage cluster shown in FIG. 1 is set in the state shown in FIG. 11, the physical volume "PVol=2" (physical volume 130-2)/physical extent "PEID=1" in the storage 13-2 of the node 1-2, which is associated with the logical extent "LEID=4", is determined as the copy source of data. Also, assume that the physical volume "PVol=3" (physical volume 130-3)/physical extent "PEID=2" in the storage 13-3 of the node 1-3 is determined as the destination of data copy.

Figure 12:
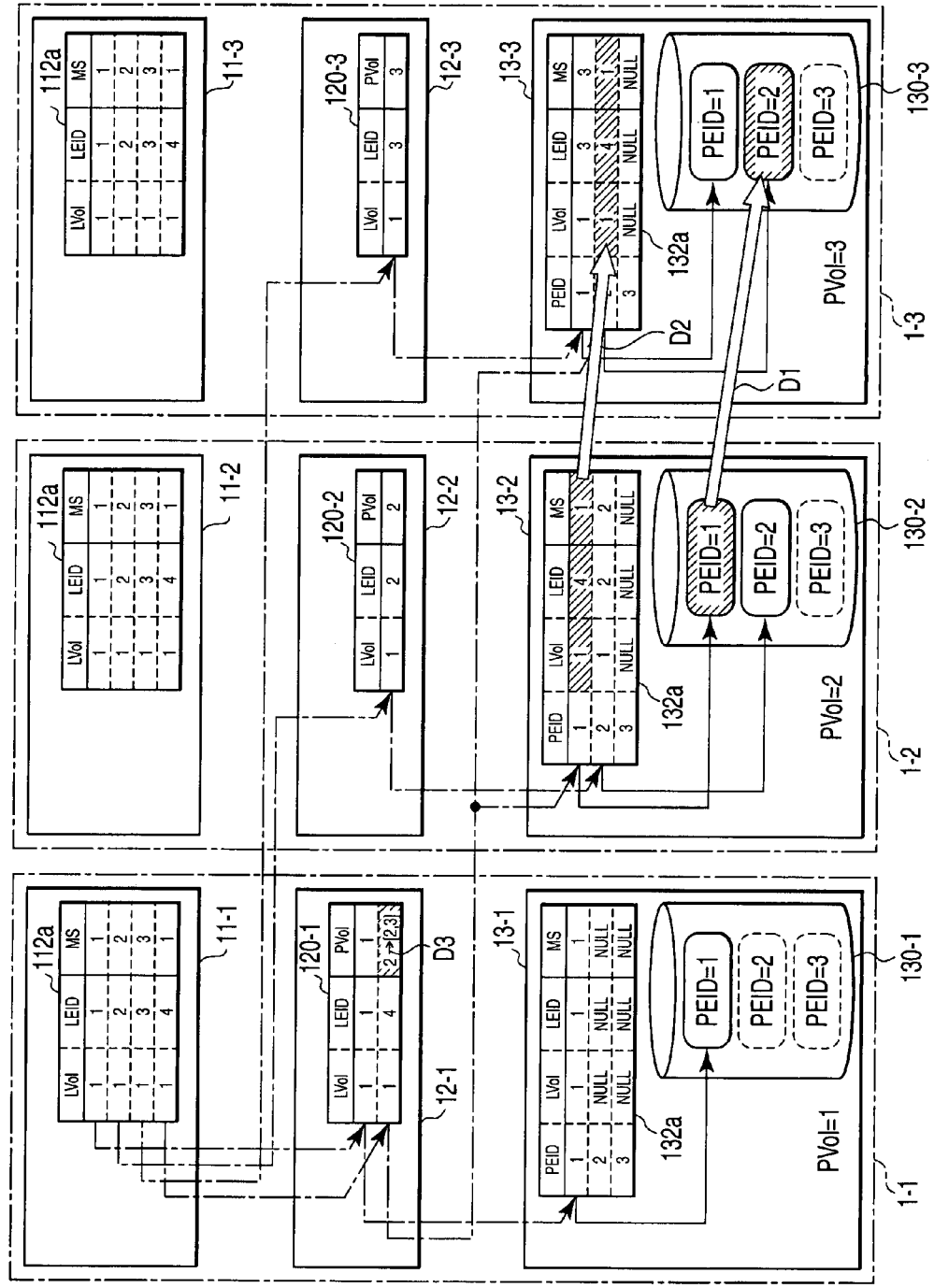
FIG. 12 is an illustration of an operation of copying data of a physical extent that forms a logical extent to a physical extent in another storage in the storage system according to the first embodiment of the present invention.

In this case, the data of logical volume "LVol=1"/logical extent "LEID=4" stored in the physical volume "PVol=2"/physical extent "PEID=1" in the storage 13-2 of the node 1-2 is copied to the physical volume "PVol=3"/physical extent "PEID=2" in the storage 13-3 of the node 1-3, as indicated by arrow D1 in FIG. 12. This copying is performed by, e.g., the IO drivers 131 of the storages 13-2 and 13-3.

The LPMT 132a of the storage 13-3 of the copy destination of data is rewritten. Here, LVol (=1), LEID (=4) and MS (=1) in the entry which holds "PEID =1" in the LPMT 132a of the storage 13-2 are copied to LVol, LEID and MS in the entry which holds "PEID=2" in the LPMT 132a of the storage 13-3, as indicated by arrow D2 in FIG. 12.

Further, the LSMT 120-1 of the management server 12-1 which refers to the logical extent "LEID=4" is rewritten by, e.g., the IO driver 131 of the storage 13-1. Here, "3" is added to PVol in the entry that holds "LEID=4", in the LSMT 120-1 managed by the management server 12-1 of the node 1-1, as indicated by arrow D3 in FIG. 12. If the entry in the LSMT 120-1 is rewritten, the logical extent "LEID=4" is associated with the physical volume "PVol=3" of the node 1-3 in addition to the physical volume "PVol=2" of the node 1-2. In other words, the physical extent that forms the logical extent "LEID=4" is made redundant to the physical volume "PVol=2" of the node 1-2 and the physical volume "PVol=3" of the node 1-3.

Assume that after the physical extent that forms the logical extent is made redundant, the host requires the controller 11-i to gain write access to the logical extent. In this case, the controller 11-i writes data to all of the physical extents corresponding to the logical extent. If, therefore, write access to the logical extent "LEID=4" is issued, data is written to the physical volume "PVol=2"/physical extent "PEID=1" of the node 1-2 and the physical volume "PVol=3"/physical extent "PEID=2" of the node 1-3. Data read is not limited to this and, in other words, data is read out of one of the physical volume "PVol=2"/physical extent "PEID=1" and the physical volume "PVol=3"/physical extent "PEID=2".

An operation of migrating a location management service regarding the logical extent to another node will be described with reference to FIG. 13. This migration is carried out for load distribution of the location management service or for exchange/updating of hardware that forms the node.

When a location management service regarding the logical extent is migrated, for example, the configuration management unit 3 determines the source and destination from and to which the service is migrated. Assume here that when the storage cluster shown in FIG. 1 is set in the state shown in FIG. 12, the management server 12-1 of the node 1-1 is determined as the migration source of the location management service. The management server 12-1 takes charge of a name service regarding the logical volume "LVol=1"/logical extent "LEID=4". Also, assume that the management server 12-2 of the node 1-2 is determined as the migration destination of the name service.

Figure 13:
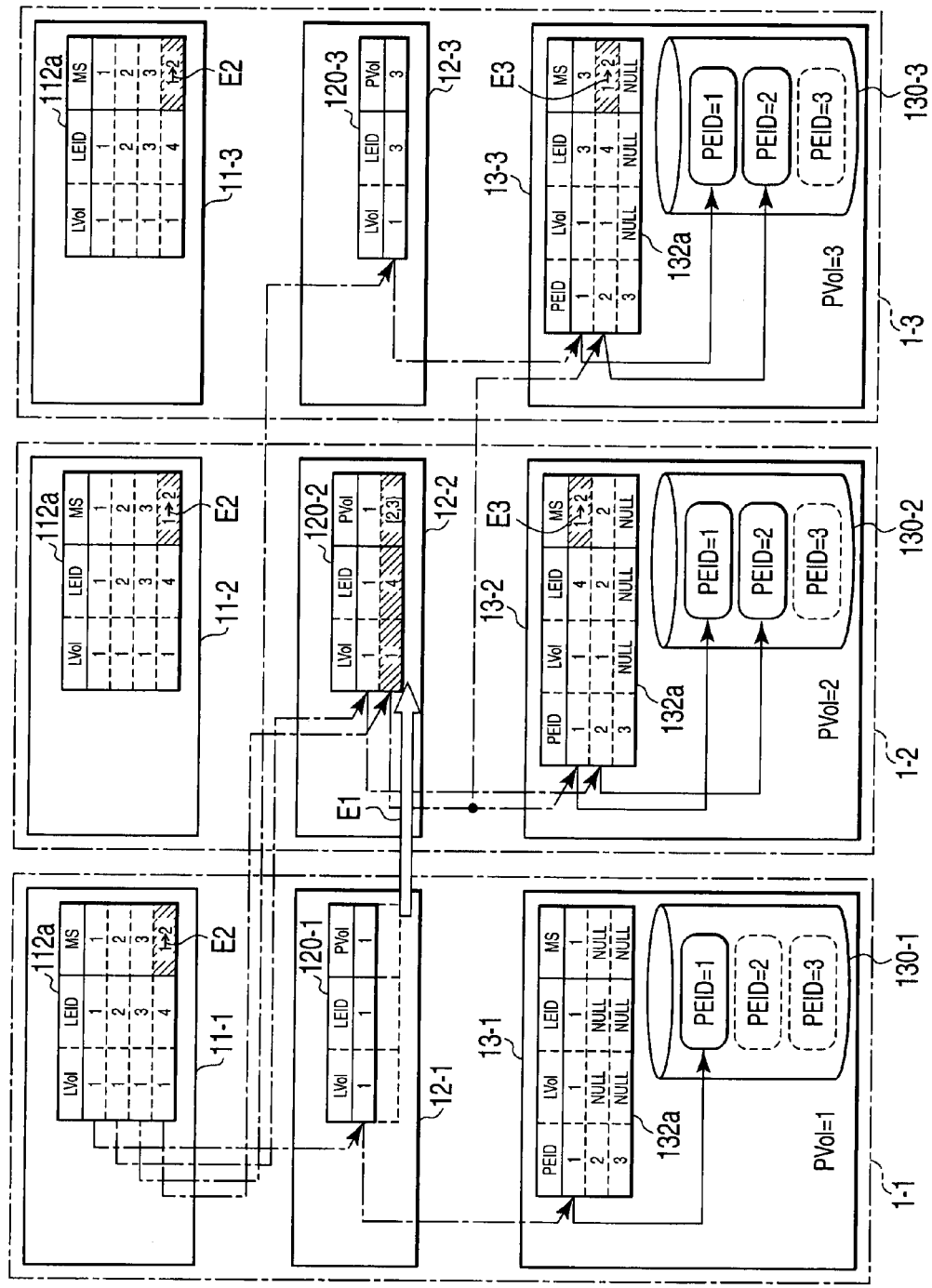
FIG. 13 is an illustration of an operation of migrating a location management service regarding a logical extent to another node in the storage system according to the first embodiment of the present invention.

Then, the information of an entry in the LSMT 120-1 which relates to the logical volume "LVol=1"/logical extent "LEID=4" of the node 1-1 of the migration source is migrated to the LSMT 120-2 of the node 1-2 of the migration destination, as indicated in arrow E1 in FIG. 13. For example, the management server 12-1 of the node 1-1 of the migration source or, for example, the management server 12-2 of the node 1-2 of the migration destination notifies all of the controllers 11-1 to 11-3 that the location management service regarding the logical volume "LVol=1"/logical extent "LEID=4" is migrated to the node 1-2.

Each of the controllers 11-1 to 11-3 rewrites the MS of an entry in the LMMT 112*a* related to the logical volume "LVol=1"/logical extent "LEID=4" from the ID (MS=1) of the node 1-1 (the management server 12-1 of the node 1-1) to the ID (MS=2) of the node 1-2 (the management server 12-2 of the node 1-2), as indicated by arrow E2 in FIG. 13.

The storages 13-2 and 13-3 of the nodes 1-2 and 1-3 that manage the logical volume "LVol=1"/logical extent "LEID=4" change the inverted index of a location management service regarding the logical volume "LVol=1"/logical extent "LEID=4" in the LPMTs 132*a* of the storages 13-2 and 13-3. As indicated by arrows E3 in FIG. 13, the ID (MS=1) of the node 1-1 (the management server 12-1 of the node 1-1) is changed to the ID (MS=2) of the node 1-2 (the management server 12-2 of the node 1-2). The storages 13-2 and 13-3 return information about the change to the notification source node of the migration of the location management service.

When each of the controllers 11-1 to 11-3 rewrites its own LMMT 112*a*, one of the following three methods has only to be applied. The first method employs a broadcast by the management server (management servers 12-1 or 12-2). The second method employs a broadcast by a server specification unit of a controller (controller 11-1 or 11-2). The third method employs a notification of updating to each of the controllers 11-1 to 11-3 from the source of migration.

For example, the management server 12-1 of the node 1-1 determines a response from each of the nodes 1-1 to 1-3 and deletes an entry in the LSMT 120-1 regarding the logical volume "LVol=12"/logical extent "LEID=4" of the management server 12-1. Accordingly, data of an entry in the LSMT 120-1 regarding the logical volume "LVol=1"/logical extent "LEID=4" of the management server 12-1 is migrated to the LSMT 120-2 of the node 1-2 of a migration destination. In other words, an entry in the LSMT 120-1 of the node 1-1 of a migration source and an entry in the LSMT 120-2 of the node 1-2 of a migration destination, which are related to the logical volume "LVol=1"/logical extent "LEID=4" are rewritten.

An operation of copying a location management service regarding the logical extent over the nodes will be described with reference to FIG. 14. When the location management service is not multiplexed, if a node that takes charge of the location management service malfunctions, access request from the host cannot be performed. It is thus necessary to copy the location management service over the nodes and multiplex it (make it redundant), thereby improving a fault tolerance and load distribution.

When a location management service is copied (made redundant) over the nodes, for example, the configuration management unit 3 determines the source and destination of the copy. Assume here that when the storage cluster shown in FIG. 1 is set in the state shown in FIG. 13, the management server 12-2 of the node 1-2 is determined as the copy source of the destination management service. The management server 12-2 takes charge of a name service regarding the logical volume "LVol=1"/logical extent "LEID=4". Also, assume that the management server 12-3 of the node 1-3 is determined as the copy destination of the name service.

Figure 14:
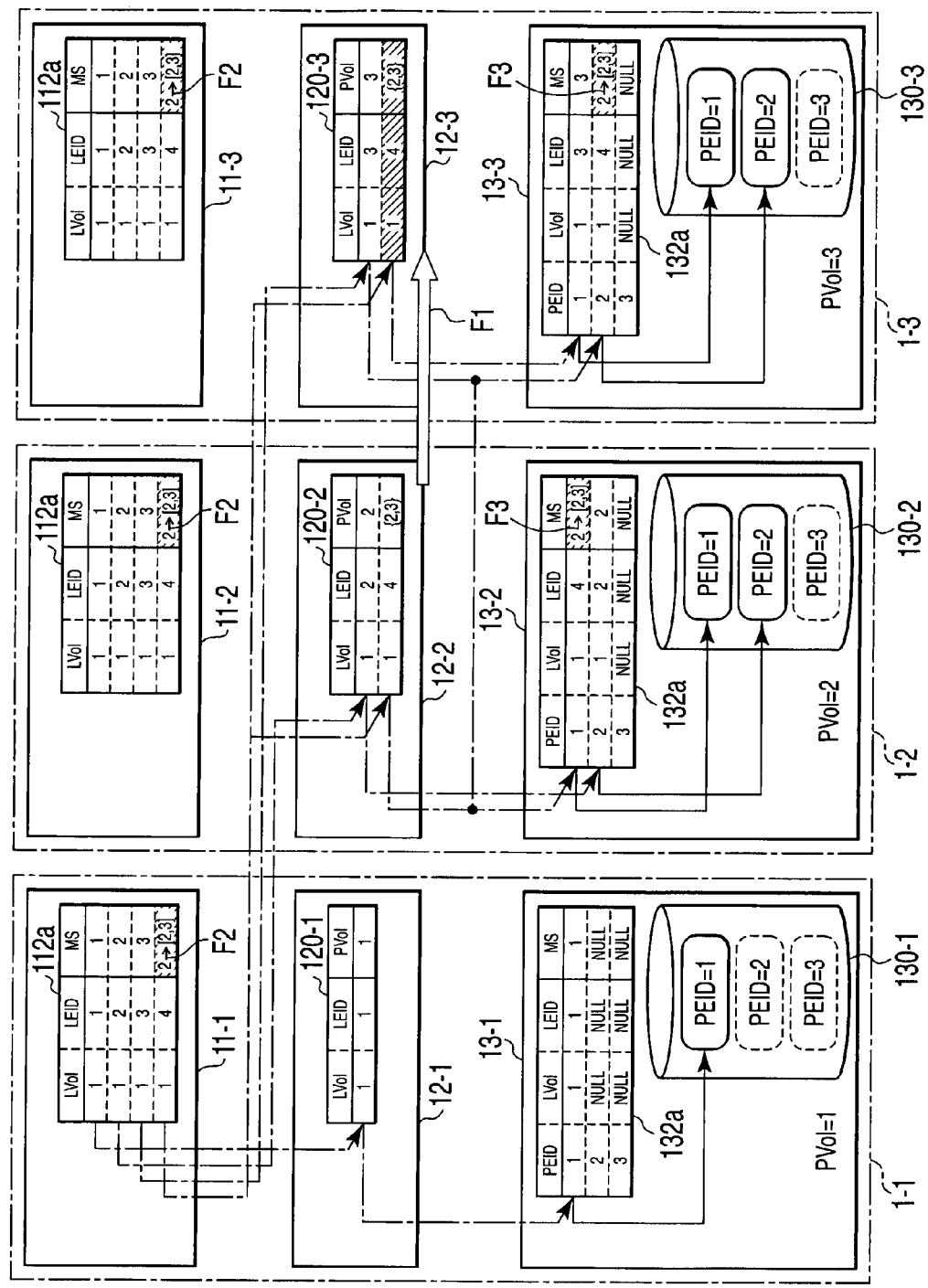
FIG. 14 is an illustration of an operation of copying a location management service regarding a logical extent to another node in the storage system according to the first embodiment of the present invention.

Then, the information of an entry in the LSMT 120-2 which relates to the logical volume "LVol=1"/logical extent "LEID=4" of the node 1-2 of the copy source is copied to the LSMT 120-3 of the node 1-3 of the copy destination, as indicated in arrow F1 in FIG. 14. For example, the management server 12-2 of the node 1-2 of the copy source or, for example, the management server 12-3 of the node 1-3 of the copy destination notifies all of the controllers 11-1 to 11-3 that the function of the location management service regarding the logical volume "LVol=1"/logical extent "LEID=4" is shared with the node 1-3 as well as the node 1-2.

Each of the controllers 11-1 to 11-3 adds the ID (MS=3) of the node 1-3 (the management server 12-3 of the node 1-3) to the MS of an entry in the LMMT 112*a* regarding the logical volume "LVol=1"/logical extent "LEID=4" as indicated by arrows F2 in FIG. 14. Before the ID (MS=3) of the node 1-3 is added, the ID (MS=2) of the node 1-2 (the management server 12-2 of the node 1-2) is set to the MS (column item MS) of the entry. Therefore, the entry in the LMMT 112*a* regarding the logical volume "LVol=1"/logical extent "LEID=4" is associated with the node 1-3 as well as the node 1-2.

With the addition of the ID of the node 1-3, the node 1-3 newly manages the logical volume "LVol=1"/logical extent "LEID=4". The storage 13-3 of the node 1-3 associates the inverted index (MS) of a location management service regarding the logical volume "LVol=1"/logical extent "LEID=4" in the LPMT 132*a* of the storage 13-3 with the node 1-3 as well as the node 1-2, as indicated by arrows F3 in FIG. 14. The storage 13-3 returns information about this change to the notification source node of the copy of the location management service. When each of the controllers 11-1 to 11-3 rewrites its own LMMT 112*a*, one of the above first to third methods has only to be applied as in the above case of the migration of a location management service.

The above descriptions are directed to the migration/copy of an extent over a plurality of nodes (storages) and that of a location management service. However, an extent can be migrated/copied within the physical volume of one node (storage) and, in this case, the LPMT 132*a* of the node (storage) has only to be updated. Moreover, for example, the LSMT 120-i of the management server 12-i and the LPMT 132*a* of the storage 13-i can be copied for redundancy.

An operation of newly adding (participating) a node to (in) the storage cluster shown in FIG. 1, will be described. In this operation, at least the LMMT 112*a* is copied to the node newly added to the storage cluster (the new node) from any one of the nodes 1-1 to 1-3 that compose the storage cluster. Thus, the new node can perform an IO operation.

In order to share the process of the management server (location management service) of any one of the nodes 1-1 to 1-3 with the new node, for example, the location management service has only to be migrated in association with the configuration management unit 3. The physical volume/physical extents in the storage newly increased by the addition of the new node can be used separately in association with the configuration management unit 3.

According to the first embodiment, as described above, when a storage cluster is composed of a plurality of nodes (three nodes in this embodiment), the amount of information that should be managed by each of the nodes can be decreased. When a physical extent corresponding to a logical extent is migrated/copied within a physical volume of a node (the storage of the node) or over the physical volumes of the nodes (the storages of the nodes), the following advantage can be obtained. All of the controllers included in the storage cluster have only to rewrite information of a management server and need not update the information such that the information items managed by the controllers in synchronization with each other are the same. In the first embodiment, the process to be performed at the time of migration/copy of an extent can be simplified and generally the performance of access can be improved.

Second Embodiment

In the first embodiment described above, the nodes 1-1, 1-2 and 1-3 of the storage cluster include controllers 11-1, 11-2 and 11-3, management servers 12-1, 12-2 and 12-3, and storages 13-1, 13-2 and 13-3, respectively. However, each of the nodes need not always include all of the controller, management server and storage. There follow a description of a second embodiment of the present invention in which some nodes of a storage cluster each include one or two of a controller, a management server and a storage.

Figure 15:
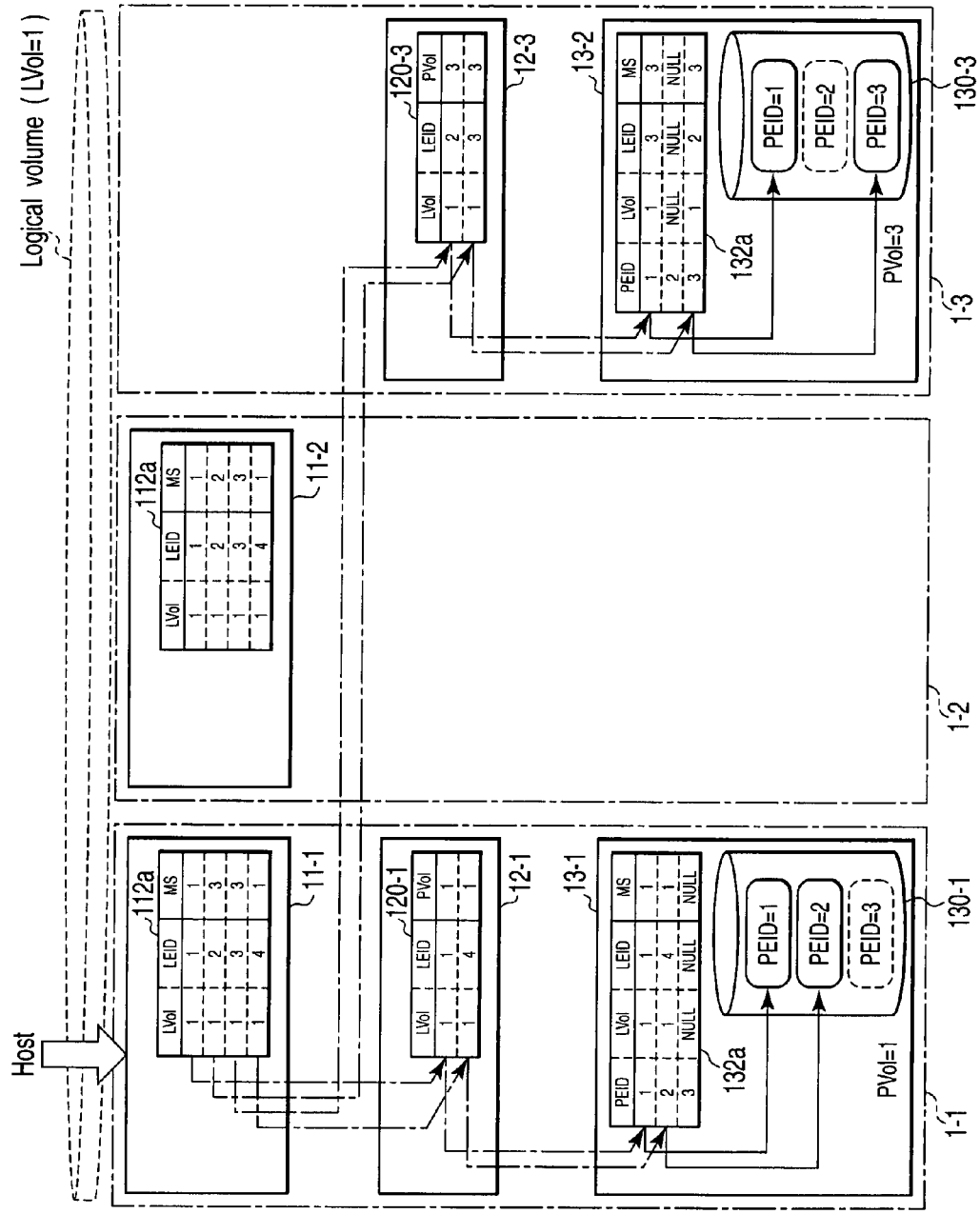
FIG. 15 is a block diagram of a storage system having a storage cluster configuration according to a second embodiment of the present invention.

FIG. 15 is a block diagram of a storage system having a storage cluster configuration according to a second embodiment of the present invention. In FIG. 15, the same components as those shown in FIG. 7 are denoted by the same reference numerals for the sake of convenience. Like in the first embodiment, the storage system (storage cluster) shown in FIG. 15 includes three nodes 1-1 to 1-3. The storage cluster of the second embodiment differs from that of the first embodiment in that the nodes 1-2 and 1-3 of the three nodes each include one or two of a controller, a management server and a storage. In FIG. 15, the node 1-1 includes a controller 11-1, a management server 12-1 and a storage 13-1 as in the first embodiment, while the node 1-2 includes a controller 11-2 only and the node 1-3 includes a management server 12-3 and a storage 13-3 only. The operation of the storage cluster shown in FIG. 15 is the same as that of the storage cluster of the first embodiment.

Assume in the second embodiment that the number of controllers, that of management servers, and that of storages are each two though the storage cluster includes three nodes. The number of management servers and the number of storages can be each set to one in the entire storage cluster. In other words, in the storage cluster including a plurality of nodes, the number of controllers has only to be at least two, and the number of management servers and the number of storages each have only to be at least one. Under the constraints, the number of controllers, that of management servers, and that of storages can appropriately be increased or decreased. With the second embodiment, only a necessary function can be expanded according to the circumstances when the storage cluster is configured.

Third Embodiment

A third embodiment of the present invention will be described. The feature of the third embodiment lies in that a disk is used effectively since a physical extent is not assigned to a logical extent on the storage side until a host actually requests first access to the logical extent.

Figure 16:
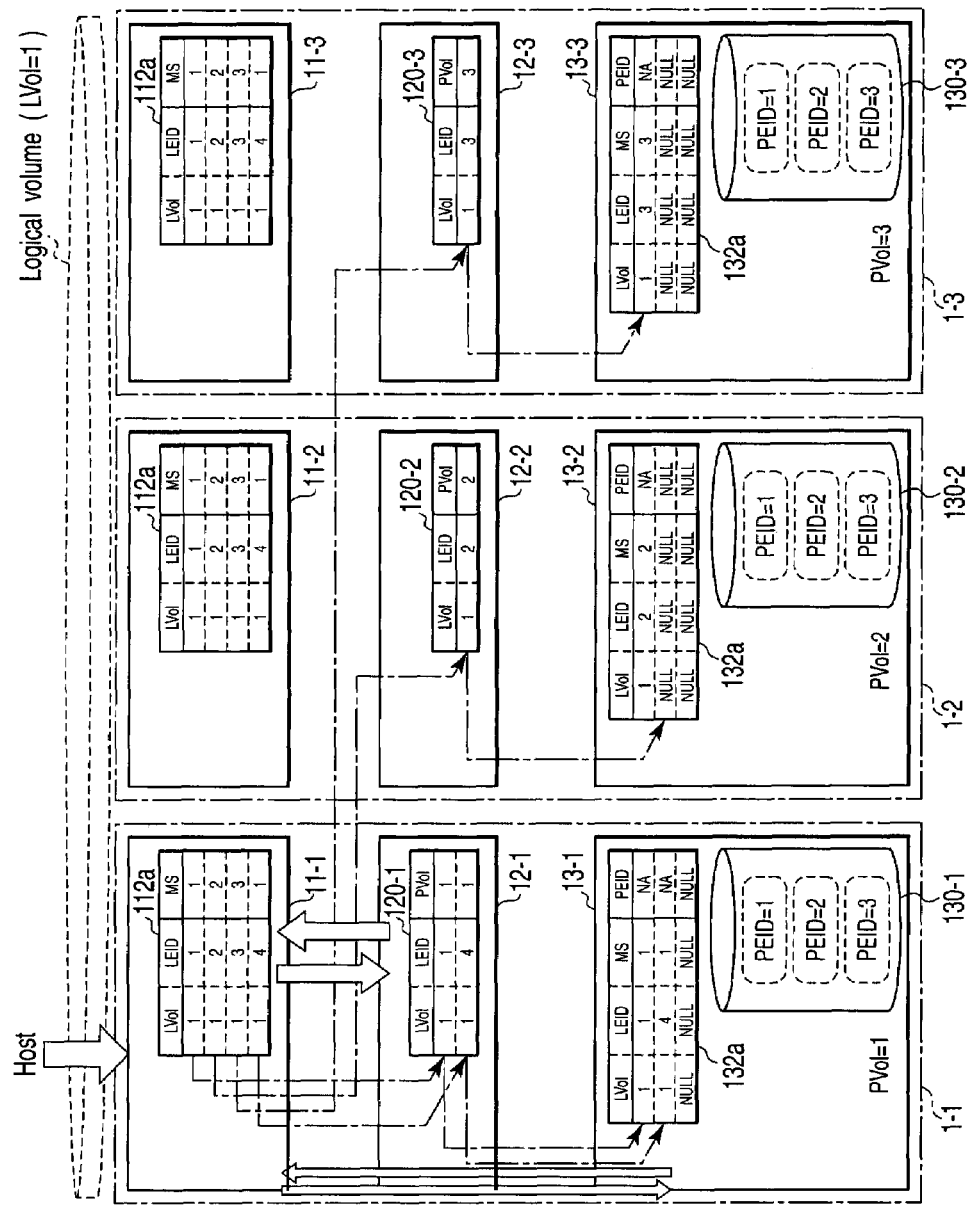
FIG. 16 is a block diagram of a storage system having a storage cluster configuration according to a third embodiment of the present invention.

FIG. 16 is a block diagram of a storage system having a storage cluster configuration according to the third embodiment of the present invention. In FIG. 16, the same components as those shown in FIG. 7 are denoted by the same reference numerals for the sake of convenience. Like in the first embodiment, the storage system (storage cluster) shown in FIG. 16 includes three nodes 1-1 to 1-3. The storage cluster of the third embodiment differs from that of the first embodiment in that a physical extent is not assigned to a logical extent on the storage (13-i) side until a host requests first access (e.g., write access) to the logical extent.

In the example of FIG. 16, the LPMT 132a of the storage 13-1 indicates that the physical extent of a physical volume 130-1 in the node 1-1 is not assigned to the logical volume "LVol=1"/logical extent "LEID=1" or the logical volume "LVol=1"/logical extent "LEID=4". Similarly, the LPMT 132a of the storage 13-2 indicates that the physical extent of a physical volume 130-2 in the node 1-2 is not assigned to the logical volume "LVol=1"/logical extent "LEID=2". Further, the LPMT 132a of the storage 13-3 indicates that the physical extent of a physical volume 130-3 in the node 1-3 is not assigned to the logical volume "LVol=1"/logical extent "LEID=3".

The unassignment of a physical extent is indicated by an entry in which information NA (flag NA) is set to PEID (column item PEID) in the LMPT 132a. However, information of a logical volume, that of a logical extent, and that of a node are set to the other column items LVol, LEID, and MS, respectively, in the entry. This indicates that a storage (physical volume) is assigned to the logical volume/logical extent. In other words, it indicates that an area necessary for the logical volume/logical extent designated by an entry (LVol, LEID) in the LPMT 132a is reserved on the node designated by the MS of the entry. It should be noted that the order of the column items in the entry in the LPMT 132a is varied for the sake of convenience in FIG. 16.

When a physical extent is assigned to the logical volume/ logical extent designated by the entry (LVol, LEID) in the LPMT 132a, the PEID in the entry is rewritten from NA to the ID of the assigned physical extent. The basic operation of the storage cluster shown in FIG. 16 is the same as that of the storage cluster according to the first embodiment. However, the former storage cluster differs from the latter storage cluster in the behavior made when a logical volume is created and when first access (write access) is gained to a logical extent.

The differences in the behavior between the storage cluster of the third embodiment and that of the first embodiment will be described. According to the first embodiment, a logical volume is created by the procedures of (a), (b) and (c) described above. According to the third embodiment, since a physical extent is assigned to a logical extent when first write access is gained to the logical extent, the above procedure (a) is replaced with the following procedure (a1):

(a1) The configuration management unit 3 determines which node IDs(PVol) are assigned to nodes including the storages (physical volumes) that store the logical extents that form a logical volume to be created in order to secure the capacity of the logical volume. Unlike in the procedure (a) of the first embodiment, no physical extent is assigned to each of the logical extents. The configuration management unit 3 generates an LPMT 132a indicating that no physical extent is assigned to each of the logical extents for each of the storages 13-1 to 13-3, and holds the LPMT 132a in the storage.

Figure 17:
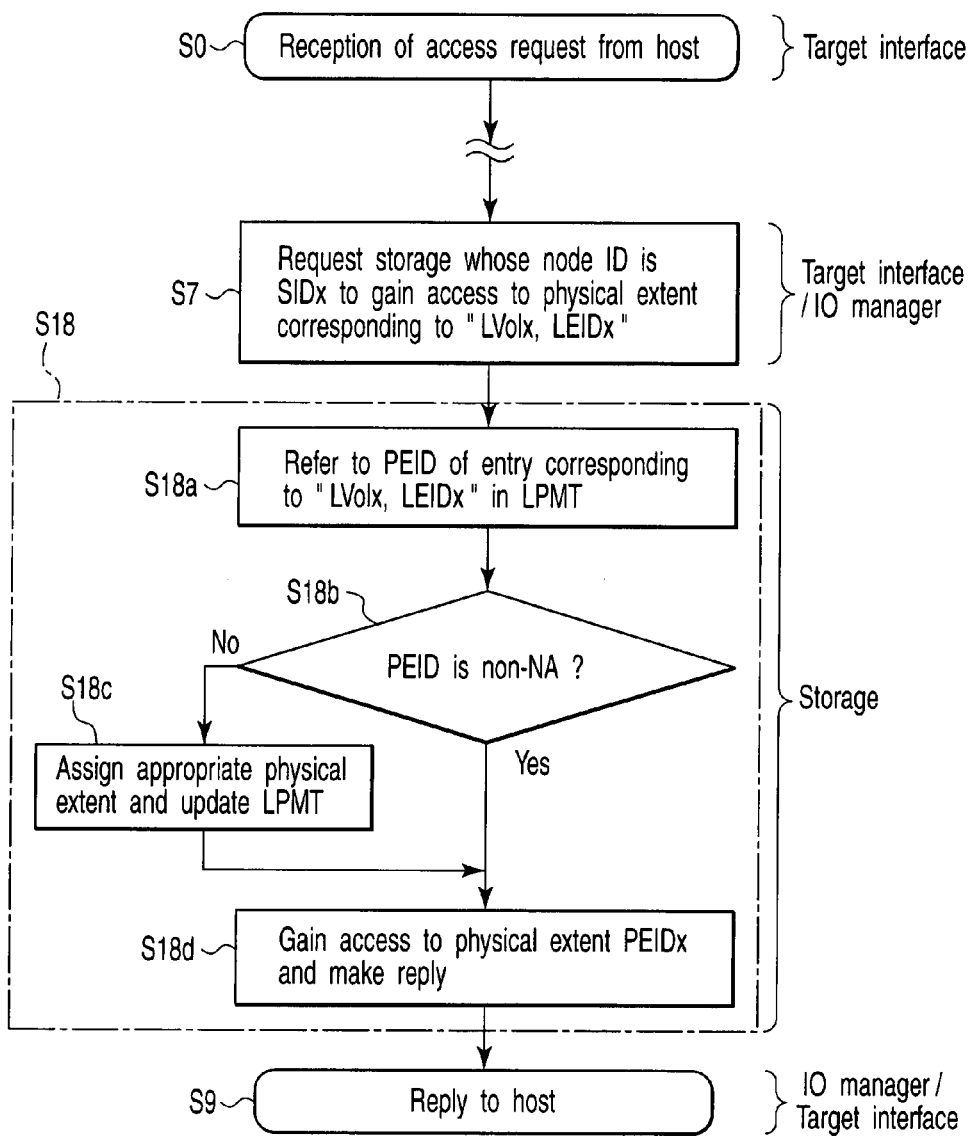
FIG. 17 is a flowchart of the procedures of a process performed when a host issues an access request in the storage system according to the third embodiment of the present invention.

An operation of the storage cluster shown in FIG. 16, which is performed when the host gains write access to a logical extent, will be described referring to the flowchart shown in FIG. 17 and using FIGS. 1 to 3. In FIG. 17, the same components as those of the flowchart shown in FIG. 4 are denoted by the same reference numerals. The flowchart of FIG. 17 differs from that of FIG. 4 in that step S18 is used in place of step S8. The feature of step S18 lies in that step S18 includes a process of determining a physical extent to which a logical extent is assigned since no physical extent is assigned to the logical extent when the first access to the logical extent is write access.

Assume that the host requires access (write access) to a target interface 111 included in the controller 11-1 of the node 1-1 as in the first embodiment. As in the flowchart shown in FIG. 4, steps S0 to S7 are executed first. In FIG. 17, steps S1 to S6 of steps S0 to S7 are omitted. In step S7, the host requires the storage whose node ID is SIDx, e.g., the storage 13-1 of the node 1-1 to gain access to the physical extent corresponding to the logical extent "LVolx, LEIDx". Then, in the storage 13-1, the process of step S18 is performed as follows.

First, the IO driver 131 of the storage 13-1 refers to the PEID of an entry in the LPMT 132a that is associated with the logical extent "LVolx, LEIDx" (step S18a). The storage 13-1 determines whether a physical extent is assigned to the logical extent "LVolx, LEIDx" according to whether the PEID is non-NA (step S18b).

If the PEID is NA and thus no physical extent is assigned to the logical extent "LVolx, LEIDx", the IO driver 131 executes step S18c in association with the configuration management unit 3. In step S18c, the IO driver 131 assigns a proper (empty) physical extent PEIDx in the storage 13-1 (physical volume 130-1) to the logical extent "LVolx, LEIDx". In step S18c, the IO driver 131 also updates the PEID of an entry in the LPMT 132a that is associated with the logical extent "LVolx, LEIDx" to the ID (=PEIDx) of the physical extent PEIDx from the NA. Then, the IO driver 131 gains access to the physical extent PEIDx and replies to the IO manager 113 of the controller 11-1 (step S18d). On the other hand, if the PEID is non-NA and thus a physical extent (e.g., physical extent PEIDx) has already been assigned to the logical extent "LVolx, LEIDx" (step S18b), the IO driver 131 skips step S18c and executes steps S18d.

According to the third embodiment, when first access to a logical extent is write access, a physical extent is assigned to the logical extent. On the other hand, when first access to a logical extent is read access, or when a read access is issued to a logical extent to which no data is written, a physical extent can be or need not be assigned to the logical extent. When it is assigned, the IO driver 131 has only to execute step S18. In either case, appropriate data such as data of zero has only to be returned as a response to a read request. The method of assigning a physical extent according to the third embodiment can be applied to the second embodiment. According to the third embodiment, in each of the storages, the optimum physical extent can be assigned in accordance with the circumstances when the host requests access.

Fourth Embodiment

A fourth embodiment of the present invention will be described. The feature of the fourth embodiment lies in that an area of a logical extent is not reserved until a host actually requests first access to the logical extent.

Figure 18:
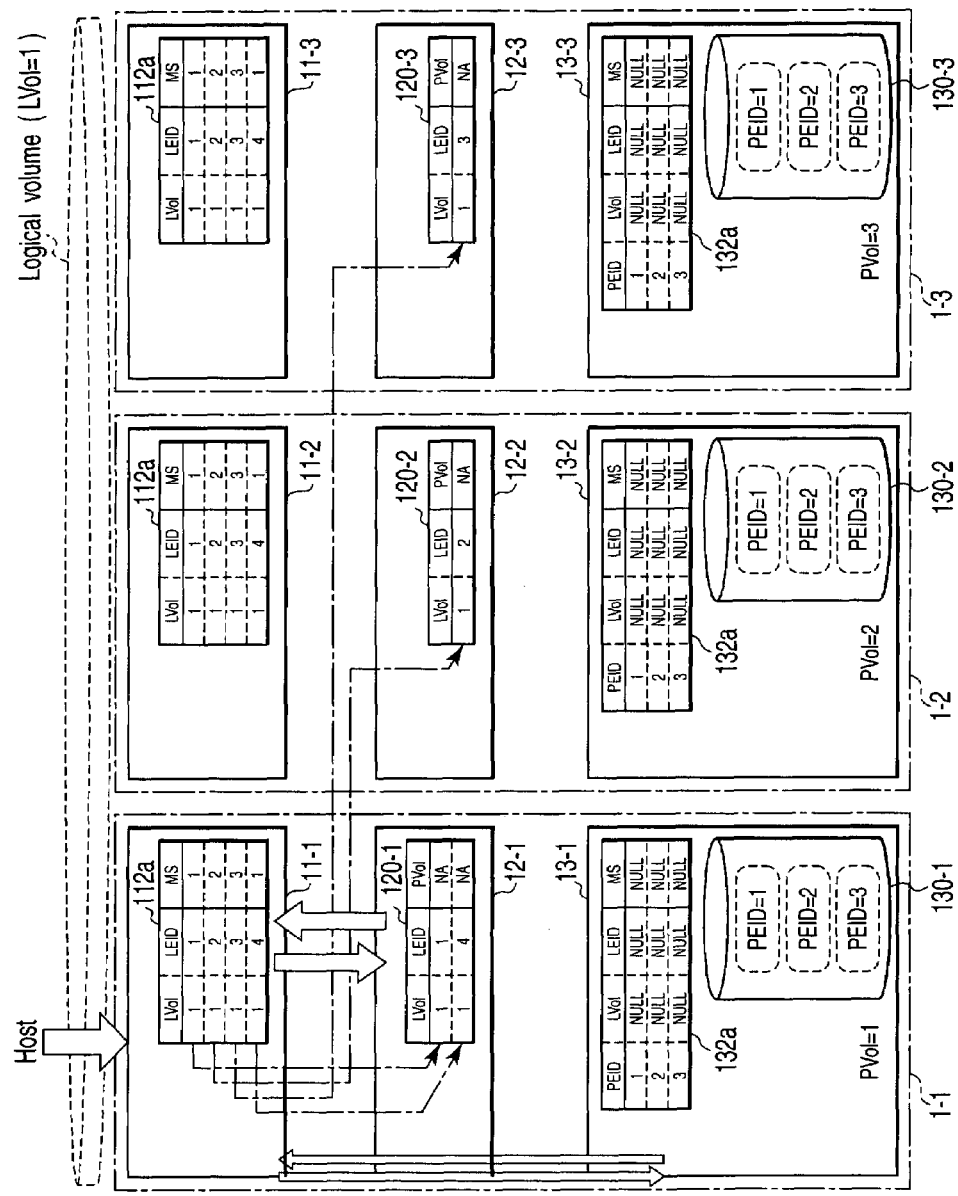
FIG. 18 is a block diagram of a storage system having a storage cluster configuration according to a fourth embodiment of the present invention.

FIG. 18 is a block diagram of a storage system having a storage cluster configuration according to the fourth embodiment of the present invention. In FIG. 18, the same components as those shown in FIG. 7 are denoted by the same reference numerals for the sake of convenience. Like in the first embodiment, the storage system (storage cluster) shown in FIG. 18 includes three nodes 1-1 to 1-3. The storage cluster of the fourth embodiment differs from that of the first embodiment in that not only a physical extent is not assigned to a logical extent but also a storage (physical volume) is not assigned to the logical extent (not reserved) until a host actually requests first access to the logical extent.

In the storage cluster shown in FIG. 18, an area of a logical extent is not reserved until first access to the logical extent is required. Thus, entries of the LPMTs 132a of the storages 13-1 to 13-3 need not be reserved when a logical volume is created. The assignment of a storage (physical volume) and a physical extent to the logical extent is performed by a management server 12-j (j=1, 2, 3) in response the inquiry from a controller 11-i (i=1, 2, 3). This assignment is planned by, for example, the configuration management unit 3.

FIG. 18 shows that no storage (physical volume) has been assigned to each of the logical extents of a logical volume. More specifically, the LSMT 120-1 of the management server 12-1 indicates that no storage (physical volume) is assigned to the logical volume "LVol=1"/logical extent "LEID=1" or the logical volume "LVol=1"/logical extent "LEID=4". Similarly, the LSMT 120-2 of the management server 12-2 indicates that no storage (physical volume) is assigned to the logical volume "LVol=1"/logical extent "LEID=2". Further, the LSMT 120-3 of the management server 12-3 indicates that no storage (physical volume) is assigned to the logical volume "LVol=1"/logical extent "LEID=3". The unassignment of a storage (physical volume) is indicated by an entry in which NA (flag NA) is set to PVol (column item PVol) in the LSMTs 120-1 to 120-3. It should be noted that in FIG. 18 no arrows are drawn from the entries of the LSMTs 120-1 to 120-3 to the entries of the LPMTs 132a of the storages 13-1 to 13-3.

The basic operation of the storage cluster shown in FIG. 18 is the same as that of the storage cluster according to the first embodiment. However, the former storage cluster differs from the latter storage cluster in the behavior made when a logical volume is created and when first access is gained to a logical extent.

The differences in the behavior between the storage cluster of the fourth embodiment and that of the first embodiment will be described. According to the first embodiment, a logical volume is created by the procedures of (a), (b) and (c) described above. According to the fourth embodiment, a storage (physical volume) that stores a logical extent when first access is gained to the logical extent is determined, and a physical extent is assigned to the logical extent in the determined storage (physical volume). The above procedures (a) and (b) are replaced with the following procedures (a2) and (b2)

(a2) The configuration management unit 3 does not determine which node IDs(PVol) are assigned to nodes including the storages (physical volumes) that store the logical extents that form a logical volume to be created. The configuration management unit 3 generates an empty LPMT 132a for each of the storages 13-1 to 13-3 as shown in FIG. 18, and holds the LPMT 132a in the storage.

(b2) The configuration management unit 3 determines which node includes the management servers that take charge of location management services of logical extents; however, it does not determine which storages (physical volumes) store the logical extents. Thus, the configuration management unit 3 generates LSMTs 120-1 to 120-3 including entry information items whose PV01 are NA and which relate to logical extents that the management servers 12-1 to 12-3 take charge of, and sets them in the management servers 12-1 to 12-3. As in the second embodiment, a management server (LSMT) need not be provided for each of the nodes 1-1 to 1-3 in the storage cluster.

Figure 19:
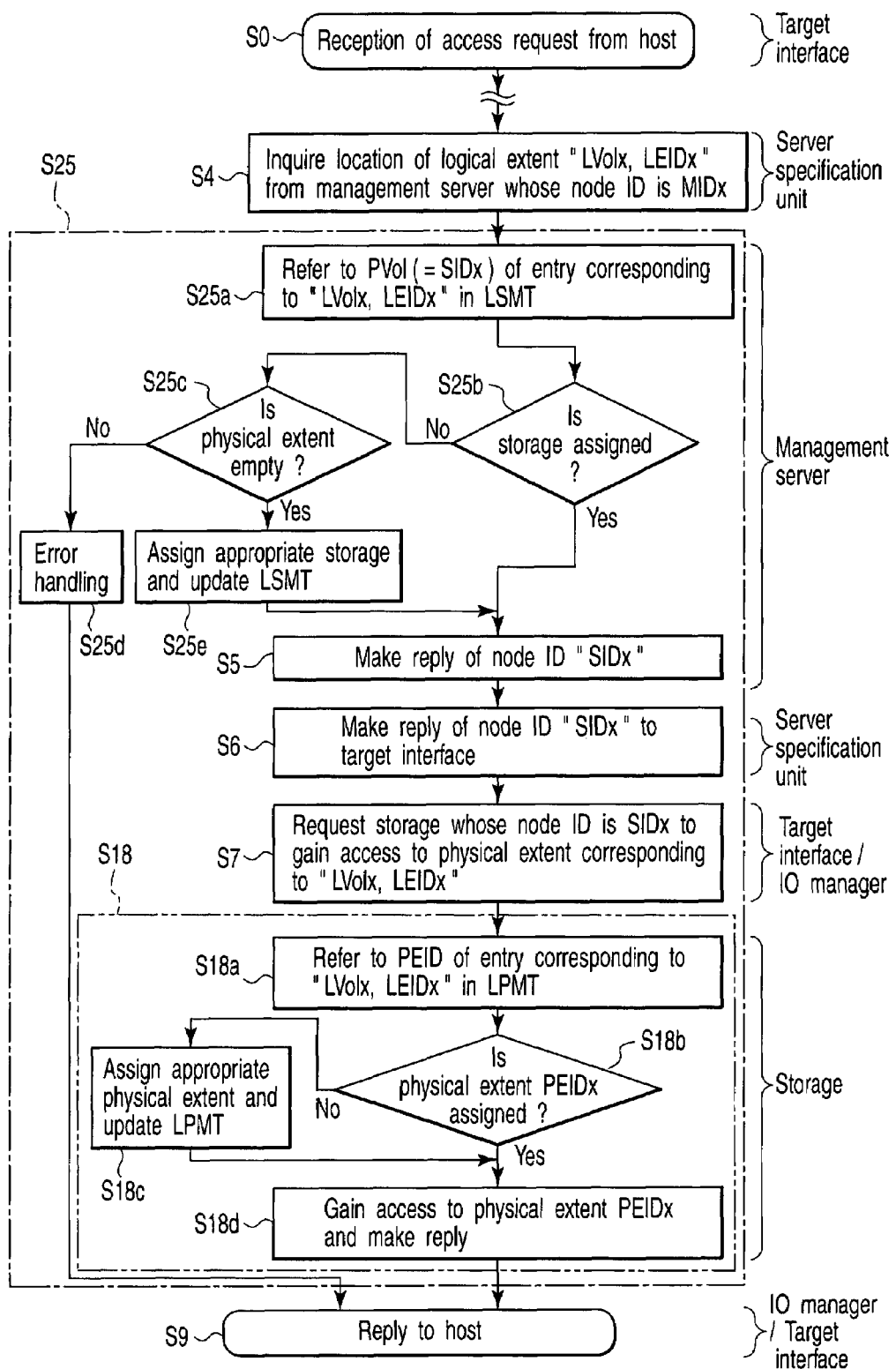
FIG. 19 is a flowchart of the procedures of a process performed when a host issues an access request in the storage system according to the fourth embodiment of the present invention.

An operation of the storage cluster shown in FIG. 18, which is performed when the host gains write access to a logical extent, will be described referring to the flowchart shown in FIG. 19 and using FIGS. 1 to 3. In FIG. 19, the same components as those of the flowchart shown in FIG. 4 or FIG. 17 are denoted by the same reference numerals.

Assume that the host requires access to a target interface 111 included in the controller 11-1 of the node 1-1 as in the first embodiment. As in the flowchart shown in FIG. 4, steps S0 to S4 are executed first. In FIG. 19, steps S1 to S3 of steps S0 to S4 are omitted. In step S4, for example, the server specification unit 112 of the controller 11-1 inquires a location of the logical extent (target logical extent) "LVolx, LEIDx" of, e.g., the management server 12-1. In other words, the unit 112 inquires the node ID "SIDx" of a storage that stores a physical extent corresponding to the logical extent "LVolx, LEIDx". Then, in the management server 12-1, the process of step S25 is performed as follows.

First, the management server 12-1 refers to the LSMT 120-1 in order to check which node ID "SIDx" is assigned to a node including a storage (physical volume) that stores a physical extent corresponding to the logical extent "LVolx, LEIDx" (step S25a). Here, the management server 12-1 refers to PVol (=SIDx) in an entry of the LSMT 120-1 that is associated with the logical extent "LVolx, LEIDx".

The management server 12-1 determines whether a storage (physical volume) is assigned to the logical extent "LVolx, LEIDx" according to whether the PVol is non-NA (step S25b). If no storage (physical volume) is assigned to the logical extent "LVolx, LEIDx", the management server 12-1 checks whether there is an empty physical extent in the storages 13-1 to 13-3 (the physical volumes 130-1 to 130-3 of the storages 13-1 to 13-3) (step S25c). This check is achieved by communication of, e.g., the management server 12-1 with the IO drivers 131 of the storages 13-1 to 13-3. If there are no empty physical extent in the storages 13-1 to 13-3 (or if no response to an access request from the host can be given), an I0 error occurs (step S25d). In this case, the error is returned as a response to the access request from the host (step S9).

If there is an empty physical extent in any of the storages 13-1 to 13-3, the management server 12-1 selects a storage (e.g., storage 13-1) having an empty physical extent, as an appropriate one (step S25e). In step S25e, the management server 12-1 assigns the selected storage to the logical extent "LVolx, LEIDx". In step S25e, the management server 12-1 also updates an entry in the LSMT 120-1 such that the assignment of the storage to the logical extent "LVolx, LEIDx" is reflected in the entry. Here, the PVol of the entry in the LSMT 120-1, which is associated with the logical extent "LVolx, LEIDx" is updated from NA to the node ID (node ID of physical volume 130-1) of the storage 13-1 that is assigned to the logical extent "LVolx, LEIDx", i.e., 1(PVol=SIDx=1).

When the LSMT 120-1 is updated in step S25e, steps S5 and S6 are executed like step S4 in the flowchart shown in FIG. 4 in the first embodiment. Thus, the management server 12-1 notifies the controller 11-1 of the node ID (node ID of physical volume 130-1) of the storage 13-1 assigned to the logical extent "LVolx, LEIDx", i.e., 1(PVol=SIDx=1) via the server specification unit 112 of inquiry source. When a storage (physical volume) is assigned to the logical extent "LVolx, LEIDx" (step S25b), steps S5 and S6 are executed at once.

Upon receiving a node ID (=SIDx=1) through the server specification unit 112, the target interface 111 requests the storage 13-1 of the node 1-1 indicated by the node ID (=SIDx=1) to gain access to a physical extent corresponding to the logical extent "LVolx, LEIDx" via the IO manager 113, as in the first and third embodiments (step S7). The operations after step S7 are the same as those in the third embodiment, and step S18 including steps S18a to S18d is executed in the storage 13-1. Thus, when no physical extent is assigned to the logical extent "LVolx, LEIDx", an empty physical extent in the physical volume 130-1 is assigned to the logical extent "LVolx, LEIDx". Assume here that the physical extent PEIDx is assigned thereto. In this case, the PEID of an entry in the LPMT 132a associated with the logical extent "LVolx, LEIDx" is updated from NA to the ID (=PEIDx) of the physical extent PEIDX.

According to the fourth embodiment, not only the optimum physical extent can be assigned in accordance with the condition of each storage when the host issues an access request, but also a logical volume whose capacity exceeds the upper limit of a gross physical volume capacity can be created.

Fifth Embodiment

A fifth embodiment of the present invention will be described. The feature of the fifth embodiment lies in that information about an inquiry of a management server 12-j (j=1, 2, 3) from the server specification unit 112 of a controller 11-i (i=1, 2, 3) and a response to the inquiry (a result of the inquiry) is stored in a cache 112b. This information includes "LVolx, LEIDx" and "SIDx". The information "LVolx, LEIDx" represents a logical volume LVolx/logical extent LEIDx, or a logical extent "LVolx, LEIDx". The information "SIDx" represents the node ID of a storage that stores a physical extent corresponding to the logical extent "LVolx, LEIDx". In other words, the information "SIDx" represents the location of the logical extent "LVolx, LEIDx". When the same inquiry is needed, if the cache 112b is used, information corresponding to a response to the inquiry can quickly be obtained from the cache 112b.

Figure 20:
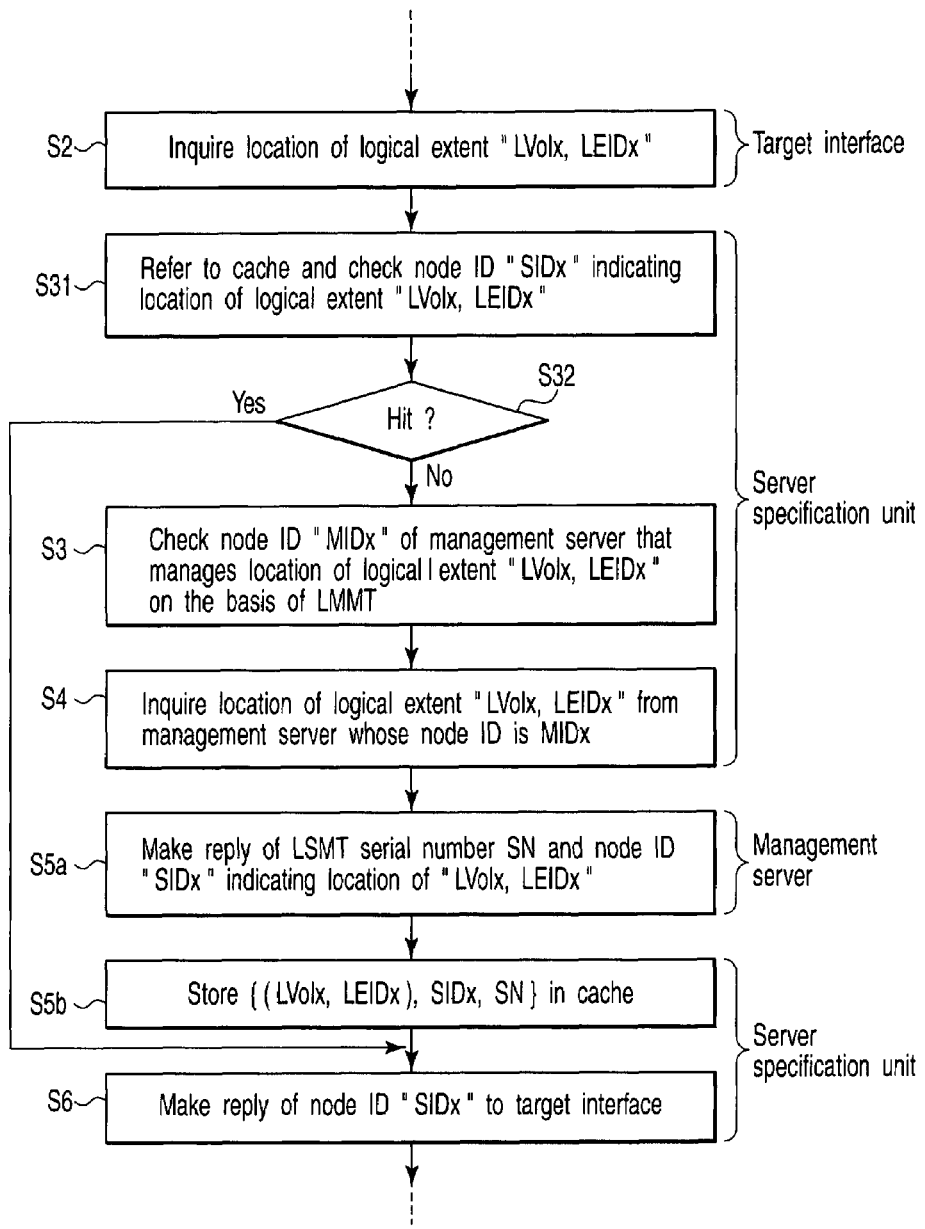
FIG. 20 is a flowchart of the procedures of a process performed when a host issues an access request in the storage system according to a fifth embodiment of the present invention.

An operation to be performed when the host gains access to a logical extent in the fifth embodiment will be described referring to the flowchart shown in FIG. 20 and using FIGS. 1 to 3 and 7. In FIG. 20, the same components as those in the flowchart shown in FIG. 4 are denoted by the same reference numerals.

Assume now that the host issues an access request to a target interface 111 included in the controller 11-1 of a node 1-1. In this case, steps S0 to S2 are executed first as in the flowchart shown in FIG. 4. In FIG. 20, steps S0 and S1 of steps S0 to S2 are omitted. In step S2, the target interface 111 of the controller 11-1 inquires of the server specification unit 112 of the controller 11-1 which node includes a storage that stores the logical extent "LVolx, LEIDx" (the location of the logical extent "LVolx, LEIDx").

Then, the server specification unit 112 executes step S31 unlike in the first embodiment. In step S31, the unit 112 refers to the cache 112b managed by itself and checks the node ID "SIDx" of a storage that stores a physical extent corresponding to the logical extent "LVolx, LEIDx". In other words, the unit 112 checks the node ID "SIDx" representing a location of the logical extent "LVolx, LEIDX".

On the basis of the execution result of step S31, the server specification unit 112 determines whether a target node ID"SIDx" is stored in the cache 112b in association with the logical extent "LVolx, LEIDx" (i.e., a hit or a mishit) (step S32). If a mishit occurs, the unit 112 executes steps S3 and S4 as in the case of the inquiry from the target interface 111 (step S2) in the first embodiment.

In the fifth embodiment, assume that the location of a storage that stores a physical extent corresponding to the logical extent "LVolx, LEIDx" is managed by the management server 12-1 of the node 1-1 and the node ID (=PVol) of the storage is SIDx (=1) as in the first embodiment. The node ID"SIDx" is obtained on the basis of the LSMT 120-1. In this case, the management server 12-1 notifies the server specification unit 112 of inquiry source of the node ID"SIDx" of a storage that stores a physical extent corresponding to the logical extent "LVolx, LEIDx" and the serial number SN of the LSMT 120-1 (LSMT serial number) (step S5a). Step S5a of the fifth embodiment differs from that of the first embodiment in that the unit 112 is notified of not only the node ID but also the serial number SN of the LSMT 120-1 used for obtaining the node ID. For example, the serial number SN is incremented by the management server 12-1 each time the LSMT 120-1 is updated. This is true of the LSMT 120-2 and LSMT 120-3.

Upon receiving a notification from the management server 12-1, the server specification unit 112 causes information including {(LVolx, LEIDX), SIDx, SN} (i.e., information about an inquiry and a response thereto) to be stored in the cache 112b (step S5b). When it is inquired again which node includes a storage that stores the logical extent "LVolx, LEIDx", the unit 112 can quickly obtain information "SIDx" corresponding to a response to the inquiry from the cache 112b in the process of step S31.

When a hit occurs in which the node ID"SIDx" associated with the logical extent "LVolx, LEIDx" can be obtained from the cache 112b as described above (step S32), the server specification unit 112 can transfer the node ID"SIDx" to the target interface 111 at once (step S6). Thus, the number of inquires of the management server from the server specification unit 112 can be decreased, and the access speed can be improved.

However, when the LSMTs 120-1 to 120-3 on the management servers 12-1 to 12-3 are updated, this updating needs to be reflected in caches 112b. The reason is as follows. Assume that the copy (redundant structure) of physical extents is managed among storages as in the first embodiment (see FIG. 12). If, in this case, the updating of the LSMTs 120-1 to 120-3 is not reflected in the caches 112b, only one of the physical extents will be rewritten by write access and the redundant structure will be broken. To avoid this, the following mechanism for cache updating is used in the fifth embodiment.

First, a serial number SN is assigned to each of the LSMTs 120-1 to 120-3. The serial number SN is incremented (updated) by, e.g., the IO drivers 131 of the storages 13-1 to 13-3 each time the LSMTs 120-1 to 120-3 are updated by the IO drivers 131. The serial number SN of the LSMT 120-j (j=1, 2, 3) used for obtaining the node ID"SIDx" in step S5a is stored in the cache 112b in combination with "(LVolx, LEIDX), SIDx" by the server specification unit 112 (step S5b). When the unit 112 determines that a mishit occurs in step S32, steps S3, S4, S5a and S5b are executed and then the unit 112 transfers the node ID"SIDx" to the target interface 111 (step S6).

The controller 11-i (i=1, 2, 3) transfers the serial number SN to the storage 13-j when access is gained to the storage 13-j. The IO driver 131 of the storage 13-j compares the serial number SN with the latest serial number SN of the LSMT 120-j recognized by the IO driver 131 itself. If both the serial numbers SN do not coincide with each other, the IO driver 131 determines that the latest updating of the LSMT 120-j is not reflected in the cache 112b managed by the server specification unit 112 of the controller 11-i. In this case, the IO driver 131 of the storage 13-j notifies the controller 11-i that its corresponding information in the cache 112b is invalidated. In other words, the IO driver 131 serves as a cache invalidation unit. In reply to the notification, the server specification unit 112 of the controller 11-i inquires of the management server 12-j again as in the case where the unit 112 determines that a mishit occurs in step S32 (steps S3 and S4). Thus, the unit 112 can acquire the latest information of the LSMT 120-j from the management server 12-j and reflect it in the cache 112b.

As will be described below, the management server 12-j may serve as a cache invalidation unit. In other words, the management server 12-j can monitor the cache 112b on the server specification unit 112 of the controller 11-j and determine whether there occurs a mismatch between the cache 112b and the LSMT 120-j managed by the server 12-j itself. If the occurrence of a mismatch is determined, the management server 12-j has only to notify the server specification unit 112 that its corresponding information in the cache 112b should be abandoned or updated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage system comprising:

a plurality of nodes, at least one of the nodes including a storage having a physical volume, the storage mapping logical extents that compose a logical volume in physical extents of the physical volume and storing the logical extents in the physical volume; and an interface which connects the nodes and a host, wherein:

at least two of the nodes include controllers which provide the host with the logical volume and receive access from the host;

said at least one of the nodes or at least another one of the nodes includes a management server which performs a location management service to reply to an inquiry about a location of a storage that stores the logical extents of the logical volume from any of the controllers;

each of the controllers includes a first mapping table indicating a management server corresponding to the logical extents of the logical volume;

the management server included in said at least one of the nodes includes a second mapping table indicating which node includes a storage that stores logical extents corresponding to the management server included in said at least one of the nodes;

the storage included in said at least one of the nodes includes a third mapping table indicating which physical extents of the physical volume included in the storage included in said at least one of the nodes store the logical extents;

when each of the controllers receives an access request that designates a logical extent in the logical volume as an access destination from the host, said each of the controllers refers to its corresponding first mapping table to specify a management server corresponding to the designated logical extent, and inquires of the specified management server which storage stores the designated logical extent;

when the specified management server receives an inquiry from one of the controllers, the specified management server refers to the second mapping table to specify the inquired storage which stores the designated logical extent, and notifies said one of the controllers, which is an inquiry source, of information indicating the inquired storage which stores the designated logical extent as a reply to the inquiry;

each of the controllers requests the storage indicated by the information as a reply to the inquiry to gain access to the logical extent designated by the host; and when one of the controllers requests the storage indicated by the information to gain access to a logical extent, the storage indicated by the information refers to the third mapping table to specify a physical extent corresponding to the designated logical extent in the physical volume, gains access to the specified physical extent, and replies to said one of the controllers which is an access request source.

2. The storage system according to claim 1, wherein:

at least one node different from said at least one of the nodes includes another storage different from the storage included in said at least one of the nodes, said another storage including another third mapping table different from the third mapping table; and when an extent migration occurs to cause data in a physical extent that forms a logical extent to migrate from the storage included in said at least one of the nodes to another physical extent of said another storage, the third mapping table and said another third mapping table are updated so as to reflect the extent migration, and the second mapping table included in the management server is updated so as to show said another storage of a migration destination as a storage that stores the logical extent formed by the extent migration.

3. The storage system according to claim 1, wherein:

at least one node different from said at least one of the nodes includes another storage different from the storage included in said at least one of the nodes, said another storage including another third mapping table different from the third mapping table; and when an extent copying occurs to copy data in a physical extent that forms a logical extent from the storage included in said at least one of the nodes to another physical extent of said another storage, the third mapping table is updated so as to reflect the extent copying, and the second mapping table included in the management server is updated so as to show said another storage of a copying destination as well as the storage included in said at least one of the nodes of a copying source as a storage that stores the logical extent formed by the extent copying.

4. The storage system according to claim 1, wherein:

said at least one of the nodes or at least another one node different from said at least another one of the nodes includes another management server different from the management server included in said at least one of the nodes, said another management server performing a location management service to reply to an inquiry from any of the controllers about a location of a storage that stores the logical extents that compose the logical volume, said another management server including another second mapping table different from the second mapping table; and when a location management service migration occurs to cause information to migrate to said another second mapping table, the first mapping table of each of the controllers, the second mapping table, and said another second mapping table are updated so as to reflect the location management service migration, the information being included in the second mapping table and indicating which node includes a storage that stores a logical extent.

5. The storage system according to claim 1, wherein:

said at least one of the nodes or at least another one node different from said at least another one of the nodes includes another management server different from the management server included in said at least one of the nodes, said another management server performing a location management service to reply to an inquiry from any of the controllers about a location of a storage that stores the logical extents that compose the logical volume, said another management server including another second mapping table different from the second mapping table; and when a location management service copying occurs to copy information to said another second mapping table, the first mapping table of each of the controllers and said another second mapping table are updated so as to reflect the location management service copying, the information being included in the second mapping table and indicating which node includes a storage that stores a logical extent.

6. The storage system according to claim 1, wherein:

the third mapping table indicates only a physical volume that stores the logical extents that compose the logical volume in an initial state where the logical volume is created; and the storage included in said at least one of the nodes assigns an empty physical extent in the physical volume included in the storage included in said at least one of the nodes to the designated logical extent and updates the third mapping table when it is determined that a physical extent in the physical volume included in the storage is not associated with the designated logical extent as a result of referring to the third mapping table.

7. The storage system according to claim 1, wherein:

the second mapping table indicates unassignment of a storage to logical extents corresponding to the management server included in said at least one of the nodes including the second mapping table in an initial state where the logical volume is created;

the third mapping table indicates unassignment of a physical volume and physical extents to the logical extents that compose the logical volume in an initial state where the logical volume is created;

the management server included in said at least one of the nodes assigns a storage to a logical extent of the access destination and updates the second mapping table when it is determined that the assigned storage is not assigned to the logical extent of the access destination as a result of referring to the second mapping table; and the storage included in said at least one of the nodes assigns an empty physical extent in the physical volume included in the storage included in said at least one of the nodes to the designated logical extents extent and updates the third mapping table when it is determined that a physical extent in the physical volume included in the storage included in said at least one of the nodes is not associated with the designated logical extent as a result of referring to the third mapping table.

8. The storage system according to claim 1, wherein:
each of the controllers includes a cache that stores information about the inquiry and a reply to the inquiry from the management server included in said at least one of the nodes; and
before each of the controllers inquires of the management server included in said at least one of the nodes which storage stores a logical extent designated by the host, said each of the controllers checks whether the cache of said each of the controllers stores the information about a reply to the inquiry, and requests a storage indicated by the information about a reply to the inquiry to gain access to the designated logical extent when the information about a reply to the inquiry is stored in the cache.

9. A storage system comprising:
a plurality of nodes, the plurality of nodes including storages, controllers and management servers; and
an interface which connects the plurality of nodes and a host, wherein:
ach of the storages includes a physical volume, said each of the storages mapping a logical extent, which is included in a logical volume, in a physical extent of the corresponding physical volume of the respective storage and storing the logical extent in the corresponding physical volume of the respective storage;
each of the controllers provides the host with the logical volume and receives access from the host, each of the controllers including a first mapping table indicating management servers corresponding to logical extents that compose the logical volume;
each of the management servers performs a location management service to reply to an inquiry from any of the controllers, the inquiry relating to a location of a storage that stores a logical extent included in the logical volume, each of the management servers including a second mapping table indicating which nodes include storages that store logical extents corresponding to the management servers;
each of the storages includes a third mapping table indicating which physical extent of a physical volume included in the corresponding storage stores a logical extent;
when each of the controllers receives an access request that designates a logical extent in the logical volume as an access destination from the host, said each of the controllers refers to its corresponding first mapping table to specify a management server corresponding to the logical extent designated by the access request received by the respective controller, and inquires of the specified management server which storage stores the designated logical extent;
when each of the management servers receives an inquiry from any of the controllers, said each of the management servers refers to its corresponding second mapping table to specify an inquired storage, and notifies a controller, which is an inquiry source, of information indicating the specified storage as a reply to the inquiry from any of the controllers;
each of the controllers requests a specified storage indicated by the information as a reply to the inquiry from any of the controllers to gain access to the logical extent designated by the host; and
when any of the controllers requests each of the storages to gain access to the designated logical extent, said each of the storages refers to its corresponding third mapping table to specify a physical extent corresponding to the designated logical extent in the physical volume of the respective storage, gains access to the corresponding specified physical extent, and replies to a controller which is an access request source.

10. The storage system according to claim 9, wherein:
each of the controllers includes a cache that stores information about an inquiry and a reply to an inquiry; and
before each of the controllers inquires of the specified management server which storage stores the logical extent designated by the host, said each of the controllers checks whether the corresponding cache of said each of the controllers stores the information about a reply to an inquiry, and requests a storage indicated by the information about a reply to an inquiry to gain access to the designated logical extent when the information about a reply to an inquiry is stored in the cache.

11. The storage system according to claim 10, wherein each of the nodes includes a cache invalidation unit which checks whether a storage that stores a logical extent indicated by the second mapping table included in a corresponding management server of said each of the nodes and a storage that stores the logical extent indicated by the information about a reply, which is stored in a cache included in a corresponding controller of said each of the nodes, coincide with each other, and invalidates the cached information when both checked storages do not coincide with each other.

12. A method of processing an access request from a host in a storage system, the storage system including a plurality of nodes including at least one node having a physical volume, at least two of the nodes each including a controller which provides the host with a logical volume including a plurality of logical extents and receives access from the host using the physical volume included in said at least one node, said at least one node including a storage which maps the logical extents of the logical volume in physical extents of the physical cal volume and stores the logical extents in the physical volume, said at least one node or at least another one of the nodes including a management server which performs a location management service to reply to an inquiry about a location of a storage that stores the logical extents of the logical volume from any of the controllers, the method comprising:
specifying a management server corresponding to a logical extent of an access destination when one of the controllers receives an access request that designates a logical extent in the logical volume from the host, the specifying a management server including referring to a first mapping table included in one of the controllers, the first mapping table indicating management servers corresponding to the logical extents of the logical volume;
inquiring of the specified management server which storage stores the logical extent of the access destination by one of the controllers;
specifying the inquired storage, the specifying the inquired storage including referring to a second mapping table included in the inquired specified management server and notifying a controller, which is an inquiry source, of information indicating the specified inquired storage as a reply to the inquiry, by the inquired specified management server, the second mapping table indicating which node includes a storage that stores logical extents corresponding to the inquired specified management server;
requesting the specified inquired storage indicated by the information as a reply to the inquiry about a location of a storage that stores the logical extent of the access destination to gain access to the logical extent of the access destination designated by the host, by a controller which is an inquiry source;

specifying a physical extent associated with the designated logical extent in a physical volume included in the requested storage, the specifying a physical extent including referring to a third mapping table included in the requested storage, the third mapping table indicating which physical extents of the physical volume included in the requested storage store the logical extents;

gaining access to the specified physical extent, the gaining access including replying to a controller, which is an access request source, from the requested storage; and returning a reply of the requested storage to the host from a controller which is an access request source.

* * * * *

UNITED STATES PATENT AND TRADEMARK OFFICE
CERTIFICATE OF CORRECTION

| | |
|---|---|
| PATENT NO. | : 7,707,381 B2 |
| APPLICATION NO. | : 11/727966 |
| DATED | : April 27, 2010 |
| INVENTOR(S) | : Kobara |

It is certified that error appears in the above-identified patent and that said Letters Patent is hereby corrected as shown below:

Claim 7, column 24, line 62, change "logical extents extent" to --logical extent--.

Claim 9, column 25, line 20, change "ach of" to --each of--.

Signed and Sealed this

Twenty-second Day of June, 2010

David J. Kappos
*Director of the United States Patent and Trademark Office*